(12) United States Patent
Shimazawa et al.

(10) Patent No.: US 8,295,010 B2
(45) Date of Patent: Oct. 23, 2012

(54) THERMALLY ASSISTED MAGNETIC HEAD, HEAD GIMBAL ASSEMBLY, AND HARD DISK DRIVE

(75) Inventors: Koji Shimazawa, Tokyo (JP); Kosuke Tanaka, Tokyo (JP); Hiraku Hirabayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 1084 days.

(21) Appl. No.: 12/053,757

(22) Filed: Mar. 24, 2008

(65) Prior Publication Data

US 2008/0239541 A1 Oct. 2, 2008

(30) Foreign Application Priority Data

Mar. 27, 2007 (JP) ................ P2007-082764

(51) Int. Cl.
*G11B 5/127* (2006.01)
*G11B 5/40* (2006.01)
*G11B 11/00* (2006.01)
*G11B 5/02* (2006.01)

(52) U.S. Cl. ............... 360/125.31; 360/125.32; 360/59; 369/13.12

(58) Field of Classification Search ............ 369/13.01, 369/13.02, 13.12, 13.24; 360/114.03–114.08, 360/125.31, 125.32, 125.71, 125.74, 125.75, 360/59
See application file for complete search history.

(56) References Cited

U.S. PATENT DOCUMENTS

| | | | |
|---|---|---|---|
| 6,404,706 B1 * | 6/2002 | Stovall et al. ............ | 369/13.17 |
| 6,950,598 B1 | 9/2005 | Tawa et al. | |
| 2002/0012205 A1 * | 1/2002 | Ito et al. ................. | 360/321 |
| 2002/0015251 A1 * | 2/2002 | Ito et al. ................. | 360/59 |
| 2003/0112542 A1 * | 6/2003 | Rettner et al. ............ | 360/59 |
| 2003/0123335 A1 * | 7/2003 | Rettner et al. ............ | 369/13.24 |
| 2003/0128452 A1 * | 7/2003 | McDaniel et al. .......... | 360/59 |
| 2006/0187564 A1 * | 8/2006 | Sato et al. .............. | 360/59 |
| 2007/0230048 A1 | 10/2007 | Hasegawa | |

FOREIGN PATENT DOCUMENTS

| | | |
|---|---|---|
| JP | A 2005-190655 | 7/2005 |
| JP | A-2006-73105 | 3/2006 |
| JP | A-2007-265524 | 10/2007 |

OTHER PUBLICATIONS

Shintaro Miyanishi et al., "Near-Field Assisted Magnetic Recording," IEEE Transactions on Magnetics, vol. 41, No. 10, pp. 2817-2821, Oct. 2005.

* cited by examiner

*Primary Examiner* — Craig A. Renner
*Assistant Examiner* — Adam B Dravininkas
(74) *Attorney, Agent, or Firm* — Oliff & Berridge, PLC

(57) ABSTRACT

The thermally assisted magnetic head comprises a medium-opposing surface; a magnetic recording device whose distance from a main magnetic pole to a medium is set longer than a distance from the medium-opposing surface to the medium; a first core for receiving light; and a second core positioned between a first light exit surface of the first core and the medium-opposing surface, having a second light exit surface on the medium side; while a distance between positions where an optical intensity distribution center within the first light exit surface and a center of the main magnetic pole are orthographically projected onto a reference plane including the second light exit surface is greater than a distance between an optical intensity distribution center within the second light exit surface and the position where the center of the leading end of the main magnetic pole is orthographically projected onto the reference plane.

15 Claims, 34 Drawing Sheets

TRACK WIDTH DIRECTION

THERMALLY ASSISTED MAGNETIC HEAD, HEAD GIMBAL ASSEMBLY, AND HARD DISK DRIVE

BACKGROUND OF THE INVENTION

1. Field of the Invention

The present invention relates to a thermally assisted magnetic head for writing signals by a thermally assisted magnetic recording scheme, a head gimbal assembly (HGA) equipped with the thermally assisted magnetic head, and a hard disk drive equipped with the HGA.

2. Related Background Art

As hard disk drives have been increasing their recording density, thin-film magnetic heads have been required to further improve their performances. As the thin-film magnetic heads, composite thin-film magnetic heads having a structure in which a magnetization detecting device such as magnetoresistive (MR) device and a magnetic recording device such as electromagnetic coil device are laminated have widely been in use. These devices read/write data signals from/onto magnetic disks which are magnetic recording media.

In general, a magnetic recording medium is a sort of discontinuous body in which magnetic fine particles gather, while each magnetic fine particle has a single-domain structure. Here, one recording bit is constituted by a plurality of magnetic the particles. For enhancing the recording density, the magnetic fine particles must be made smaller, so as to reduce irregularities in boundaries of recording bits. When the magnetic fine particles are made smaller, however, deteriorations in thermal stability of magnetization due to the reduction in volume become problematic.

An index of thermal stability in magnetization is given by $K_U V/k_B T$. Here, $K_U$ is the magnetic anisotropy energy of the magnetic fine particle, V is the volume of one magnetic fine particle, $k_B$ is the Boltzmann constant, and T is the absolute temperature. Making the magnetic fine particles smaller just reduces V, so that $K_U V/k_B T$ becomes smaller, thereby deteriorating the thermal stability. As measures against this problem, $K_U$ may be increased at the same time. The increase in $K_U$, however, raises the coercivity of the recording medium. By contrast, the writing magnetic field intensity by a magnetic head is substantially determined by the saturated magnetic flux density of a soft magnetic material constituting a magnetic pole within the head. Therefore, the writing becomes impossible when the coercivity exceeds a permissible value determined by the limit of writing magnetic field intensity.

As a method for overcoming such a problem of thermal stability in magnetization, a so-called thermally assisted magnetic recording scheme has been proposed, which performs writing with a lower coercivity by applying heat to a recording medium immediately before exerting the writing magnetic field, while using a magnetic material having a large $K_U$. This scheme is roughly divided into a magnetically dominant recording scheme and an optically dominant recording scheme. The magnetically dominant recording scheme employs an electromagnetic coil device as a main part for writing, while the radiation diameter of light is larger than the track width (recording width). On the other hand, the optically dominant recording scheme employs a light radiation part as a main part for writing, while the radiation diameter is substantially the same as the track width (recording width). Namely, the magnetically dominant recording scheme provides a magnetic field with a spatial resolution, whereas the optically dominant recording scheme provides light with a spatial resolution.

As such a thermally assisted magnetic bead, Japanese Patent Application Laid-Open No. 2005-190655 discloses one in which an optical waveguide is provided near an electromagnetic coil device. In this structure, light emitted from a light-emitting device is introduced into the optical waveguide and then caused to emit from a light exit surface of the optical waveguide within a medium-opposing surface, so as to heat a magnetic recording medium locally. Subsequently, the electromagnetic coil device applies a writing magnetic field to a local area of the magnetic recording medium where the coercivity is lowered by the heating.

Also, IEEE Trans. Magn. Vol. 41, p. 2817 (2005) discloses a thermally assisted magnetic head utilizing a U-shaped near-field light generating part formed on a quartz slider. In his structure, a U-shaped curved portion of the near-field light generating part is irradiated with laser light, so as to generate near-field light thereby locally heating a magnetic recording medium. Subsequently, a current is caused to flow through the near-field light generating part, and writing is effected by an inductive magnetic field generated from the curved portion.

SUMMARY OF THE INVENTION

However, the thermally assisted magnetic head described in the above-mentioned Patent Document 1 is problematic in that it cannot respond to high recording frequencies, thereby fading to realize hard disk drives having a high transfer rate.

Namely, optical waveguide used in the above-mentioned Patent Document 1 has a structure in which, along the advancing direction of light, a core of a high refractive index region is surrounded by a cladding of a low refractive index region. For functioning as an optical waveguide, it is necessary for the core and cladding to be formed thicker than the wavelength of light introduced. When a blue laser is used as a light source, for example, it is necessary for each of the core and cladding to have a thickness of at least 400 nm.

Therefore, the thermally assisted magnetic head described in the above-mentioned Patent Document 1 yields a long distance (e.g., 400 nm or longer) between the exit surface of the optical waveguide and the electromagnetic coil, thereby requiring a certain extent of time after heating the magnetic recording medium until a recording magnetic field is applied thereto. Hence, after heating the magnetic recording medium by irradiation with light, it is necessary to keep this high-temperature state for a certain extent of time. In the case where a magnetic head floats above a part distanced by 20 mm from the center of the magnetic recording medium rotating at 5400 rpm, the time required for the magnetic head and magnetic recording medium to move relative to each other by 400 nm is estimated to be about 35 ns. However, magnetic recording is required to be performed at about 1 ns/bit at a recording frequency of 1 GHz, for example, whereby recording systems required to keep a high-temperature of the magnetic recording medium over 35 ns as mentioned above are hard to respond to high recording frequencies.

For overcoming this problem a magnetic head having a structure in which the position of a light irradiation part (medium heating part) and the position of a recording magnetic field applying part substantially coincide with each other may be employed. The structure of the thermally assisted magnetic head disclosed in the above-mentioned Nonpatent Document 1 is excellent in this respect, but is problematic in that the intensity of the recording magnetic field generated is insufficient.

Namely, wen a recording area of a magnetic recording medium is heated to such an extent that its coercivity becomes 0, protective films, lubricants, and the like on the magnetic recording medium may be thermally decomposed, and so forth in the thermally assisted magnetic recording. For preventing such a situation from occurring, it is necessary for a recording magnetic field to be applied in a state where a recording area of the magnetic recording medium is heated such as to lower its coercivity by a certain extent instead of heating it until its coercivity becomes 0. Though a sufficient intensity is necessary in the applied recording magnetic field for this purpose, the thermally assisted magnetic head described in Nonpatent Document 1 has no magnetic poles acting to focus the inductive magnetic field and thus fails to apply a magnetic field having a sufficient intensity to the magnetic recording medium. Also, the thermally assisted magnetic head described in Nonpatent Document 1 has a structure in which the laminating surface and the medium-opposing surface coincide with each other, and thus differs from the conventional magnetic head structure. Therefore, a composite thin-film magnetic head having a structure in which a magnetism detecting device and a magnetic recording device are laminated cannot be manufactured by conventional manufacturing methods, whereby a thermally assisted magnetic head having a sufficient performance is hard to yield.

The view of such problems, it is an object of the present invention to provide a thermally assisted magnetic head, head gimbal assembly, and hard disk drive which can respond to high recording frequencies.

The present invention provides a thermally assisted magnetic head comprising a medium-opposing surface opposing a magnetic recording medium; a magnetic recording device whose distance from a leading end of a main magnetic pole to the magnetic recording medium is set longer than a distance from the medium-opposing surface to the magnetic recording medium; a first core of an optical waveguide for receiving thermally assisting light; and a second core of the optical waveguide, positioned between a first light exit surface of the first core and the medium-opposing surface, having a second light exit surface on the magnetic recording medium side; wherein a distance between a position where an optical intensity distribution center within the first light exit surface is orthographically projected onto a reference plane including the second light exit surface and a position where a center of the leading end of the main magnetic pole is orthographically projected onto the reference plane is greater than a distance between an optical intensity distribution center within the second light exit surface and the position where the center of the leading end of the main magnetic pole is orthographically projected onto the reference plane.

When light is incident on the first core of the optical waveguide in the present invention, the light is emitted from the second light exit surface on the medium-opposing surface side, so as to heat the recording area of the magnetic recording medium. Heating the magnetic recording medium reduces the coercivity of the recording area. Therefore, writing can be made easily if a magnetic field generated by energizing the magnetism recording device is applied to the recording area.

Further, in the present invention, the center of the intensity distribution of light emitted from the magnetic head toward the magnetic recording medium and the leading end of the main magnetic pole as a recording magnetic field applying part are positioned closer to each other when seen from the medium-opposing surface side than in the case forming the light exit surface by linearly extending the first core of the optical waveguide to the medium-opposing surface along the main magnetic pole. Namely, the light emitted from the first light exit surface of the first core is made incident on the second core from its light entrance surface and then is emitted from the second light exit surface provided on the medium-opposing surface side. Here, the second core acts such that the center of the intensity distribution of the light emitted from the second light exit surface of the second core is closer to the main magnetic pole than is the center of the intensity distribution of the light emitted from the first light exit surface of the first core when seen from the medium-opposing surface side. In other words, the second core guides the incident light to the second light exit surface while bringing it closer to the leading end side of the main magnetic pole as seen from the medium-opposing surface side. This can shorten the time elapsing after heating the magnetic recording medium until a writing magnetic field is applied to the heated recording area. As a result, it is not necessary to keep the high-temperature state in the recording area of the magnetic recording medium for a long time, whereby the recording frequency at the time of magnetic recording can be made high.

Preferably, the position where the center of the leading end of the main magnetic pole is orthographically projected onto the reference plane is within the second light exit surface. In this case, the center of the intensity distribution of light emitted from the magnetic head to the magnetic recording medium and the leading end of the main magnetic pole acting as a recording magnetic field applying part substantially coincide with each other in terms of their positions seen from the medium-opposing surface side. This can further shorten the time elapsing after heating a magnetic recording medium until a writing magnetic field is applied to the heated recording area.

Preferably, the second light exit surface is provided with a near-field light generating part. In this case, when light is made incident on the first core, the near-field light generating part provided in the second light exit surface of the second core can be irradiated with the light, whereby the near-field light can be emitted from the second light exit surface. This near-field light attains an intensity much higher than that of the light incident on the first core of the optical waveguide and thus can fully heat the recording area of the magnetic recording medium.

Preferably, the second core increases an effective refractive index along a direction from the first core side to the main magnetic pole side. In this case, an action based on the refractive index distribution in the second core can guide the light incident on the light entrance surface of the second core to the second light exit surface while bringing the light closer to the leading end side of the main magnetic pole when seen from the medium-opposing surface side.

Preferably, the second core is formed by alternately laminating two kinds of materials having refractive indexes different from each other. This is effective in that the second core has a simple structure.

Preferably, the first core extends along a side face of the main magnetic pole intersecting a track width direction and intersects a line penetrating through the main magnetic pole in the track width direction. In this case, the position of the first core in the bit length direction (laminating direction of the magnetic head) substantially coincides with the center of the leading end of the main magnetic pole. This makes it unnecessary for the light incident on the light entrance surface of the second core from the light exit surface of the first core to bend its advancing direction to the bit length direction with the second core. As a result, the center of the intensity distribution of the light emitted from the second light exit surface of the second core can reliably be made closer to the position of the main magnetic pole seen from the medium-opposing surface side.

Preferably, the first core extends along both side faces of the main magnetic pole intersecting the track width direction. This allows the first core to guide light having a sufficient intensity to the light exit surface of the second core, whereby the magnetic recording medium can fully be heated.

Preferably, the HGA in accordance with the present invention comprises the above-mentioned thermally assisted magnetic head and a suspension for supporting the thermally assisted magnetic head. Preferably, the hard disk drive in accordance with the present invention comprises the above-mentioned HGA and a magnetic recording medium opposing the medium-opposing surface. Thus yields a hard disk drive which performs thermally assisted magnetic recording responding to high recording frequencies.

The present invention provides a thermally assisted magnetic head, head gimbal assembly, and hard disk drive which can respond to high recording frequencies.

DESCRIPTION OF THE PREFERRED EMBODIMENTS

Figure 1:
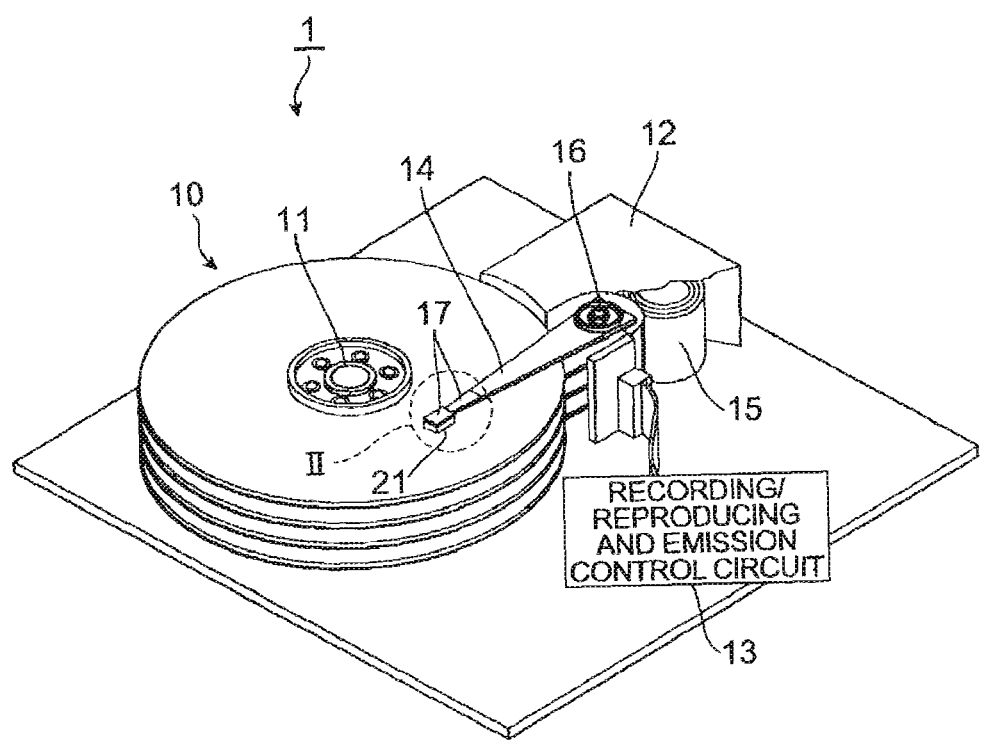
FIG. 1 is a perspective view of the hard disk drive in accordance with an embodiment.

In the following, modes for carrying out the present invention will be explained in detail with reference to the accompanying drawings. In the drawings, the same elements are referred to with the same numerals or letters. For the convenience of viewing, ratios of sizes in and between constituents in the drawings are arbitrary.

First Embodiment

To begin with, the first embodiment of the thermally assisted magnetic head, head gimbal assembly, and hard disk drive in accordance with the present invention will be explained.

Hard Disk Drive

FIG. 1 is a perspective view of the hard disk drive in accordance with the embodiment.

The hard disk drive 1 comprises magnetic disks 10 which are a plurality of magnetic recording media rotating about a rotary shaft of a spindle motor 11, an assembly carriage device 12 for positioning thermally assisted magnetic heads 21 onto tracks, and a recording/reproducing and emission control circuit (control circuit) 13 for regulating writing and reading operations of the thermally assisted magnetic heads 21 and further controlling a laser diode which is a light source for generating laser light for thermally assisted magnetic recording which will be explained later in detail.

The assembly carriage device 12 is provided with a plurality of driving arms 14. These driving arms 14 can be swung about a pivot bearing shaft 16 by a voice coil motor (VCM) 15 and are stacked along the shaft 16. Head gimbal assemblies (HGA) 17 are attached to the respective leading end parts of the driving arms 14. Each HGA 17 is provided with a thermally assisted magnetic head 21 opposing the front face of its corresponding magnetic disk 10. The surface opposing the front face of the magnetic disk 10 is a medium-opposing surface S (also known as air bearing surface) of the thermally assisted magnetic head 21. The magnetic disk 10, driving arm 14, HGA 17, and thermally assisted magnetic head 21 may be provided singly as well.

HGA

Figure 2:
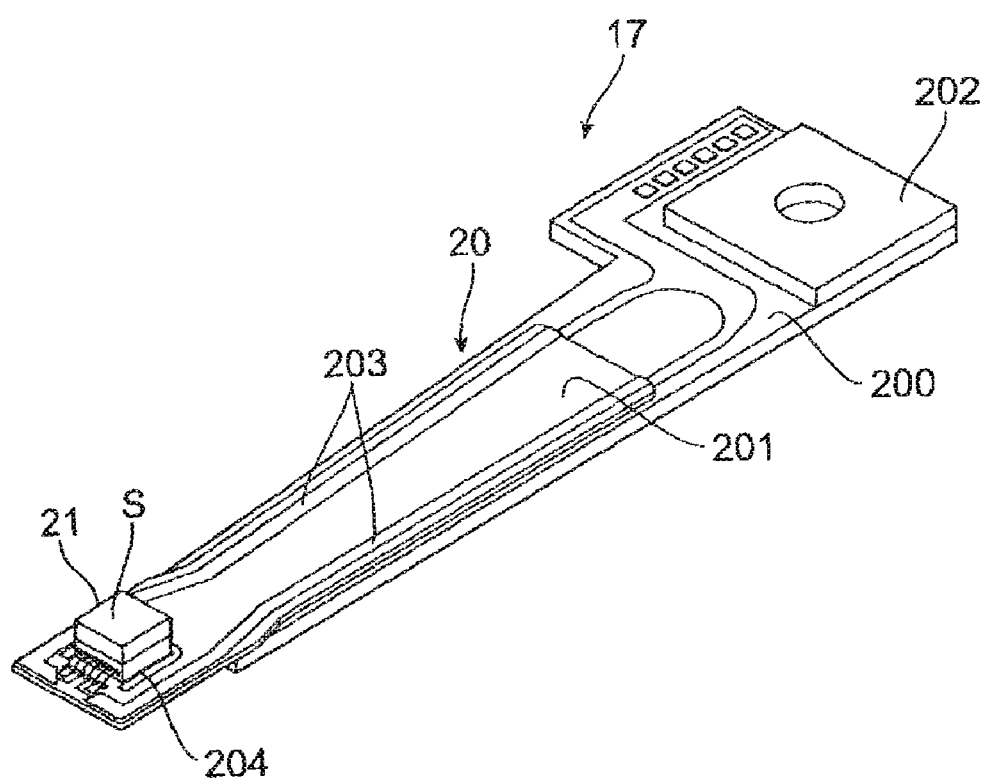
FIG. 2 is a perspective view of an HGA 17.

FIG. 2 is a perspective view of the HGA 17. This drawing shows the HGA 17 with its medium-opposing surface S facing up.

The HGA 17 is constructed such that the thermally assisted magnetic head 21 is firmly attached to the leading end part of a suspension 20, while respective one ends of wiring members 203 are electrically connected to their corresponding terminal electrodes of the thermally assisted magnetic head 21. The suspension 20 is mainly constituted by a load beam 200, a flexure 201 which is firmly attached onto the load beam 200 and has elasticity, a tongue 204 formed like a leaf spring at the leading end of the flexure 201, a base plate 202 provided at a base part of the load beam 200, and the wiring members 203 provided on the flexure 201 and formed by lead conductors and connection pads electrically connected to both ends thereof.

It is clear that the suspension structure in the HGA 17 is not limited to the one explained in the foregoing. Though not depicted, a head driving IC chip may be mounted somewhere on the suspension 20.

Thermally Assisted Magnetic Head

Figure 3:
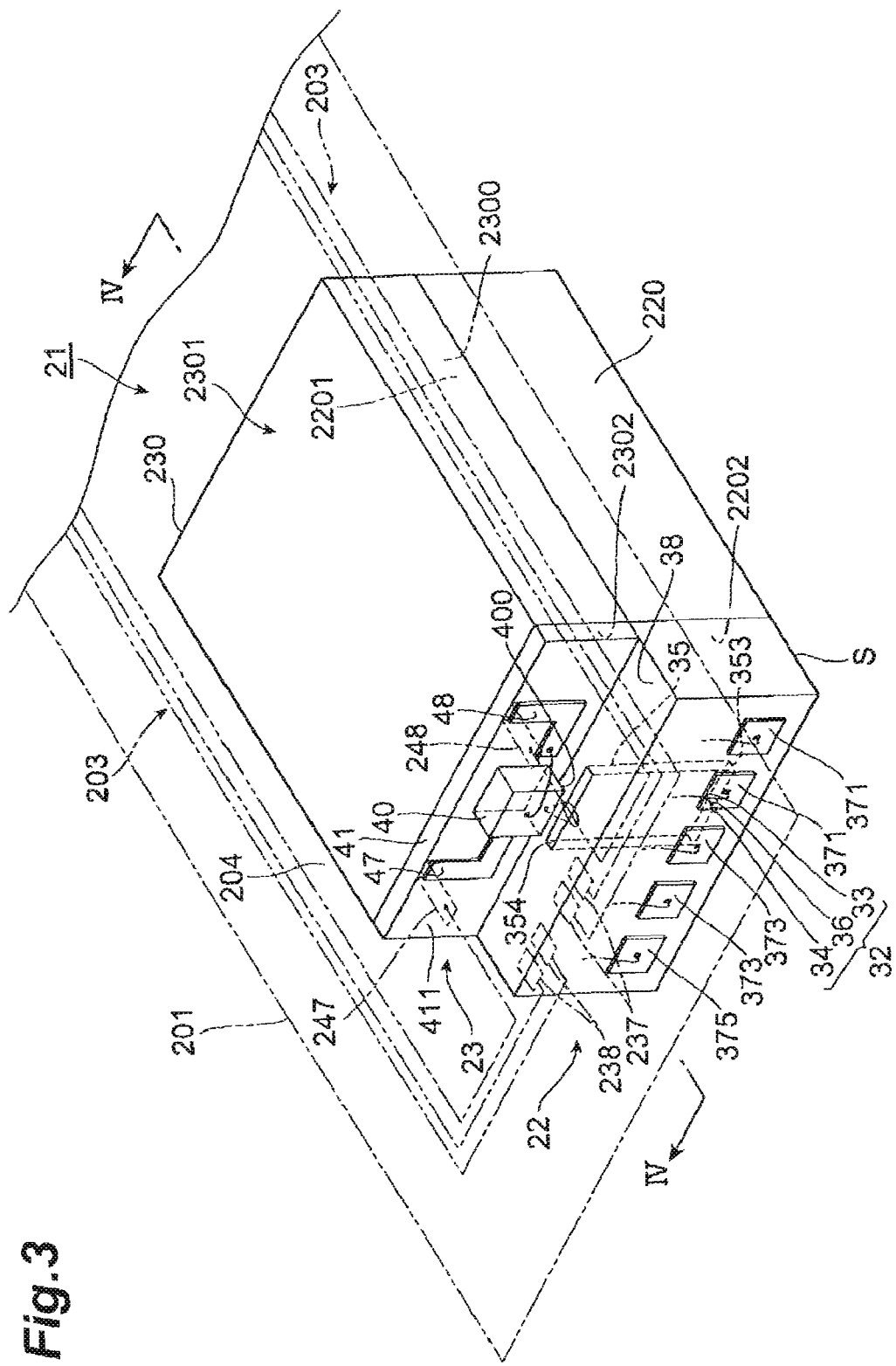
FIG. 3 is an enlarged perspective view of a thermally assisted magnetic head 21 and its vicinity shown in FIG. 1.

FIG. 3 is an enlarged perspective view of the thermally assisted magnetic head 21 and its vicinity shown in FIG. 1.

The wiring members 203 are connected to a pair of electrode pads 237, 237 for a recording signal, a pair of electrode pads 238, 238 for a reading signal, and a pair of electrode pads 247, 248 for driving a light source.

The thermally assisted magnetic head 21 has a structure in which a slider 22 and a light source unit 23 comprising a light source support substrate 230 and a laser diode (light-emitting device) 40 to become a light source for thermally assisted magnetic recording are bonded and secured to each other such that the back face (first surface) 2201 of a slider substrate 220 and a bonding surface (second surface) 2300 of the light source support substrate 230 are in contact with each other. Here, the back face 2201 of the slider substrate 220 is a surface on the side opposite from the medium-opposing surface S of the slider 22. The light source support substrate 230 has a bottom face 2301 bonded to the tongue 204 of the flexure 201 by an adhesive such as epoxy resin for example.

The slider 22 comprises the slider substrate 220 and a magnetic head part 32 for writing and reading data signals.

The slider substrate 220 has the medium-opposing surface S processed such as to exhibit a planar form and attain an appropriate amount of levitation. The slider substrate 220 is formed from AlTiC ($Al_2O_3$—TiC) or the like, which is conductive.

The magnetic head part 32 is formed on an integration surface 2202 which is a side face substantially perpendicular to the medium-opposing surface S of the slider substrate 220. The magnetic head part 32 comprises an MR device 33 as a magnetization detecting device for detecting magnetic information, an electromagnetic device 34 as a perpendicular (or in-plane) magnetic recording device for writing magnetic information by generating a magnetic field, a core 35 of a planar waveguide provided such as to pass between the MR device 33 and electromagnetic coil device 34, a near-field light generating part (plasmon probe) 36 for generating near-field light for heating a recording layer part of the magnetic disk, and an insulating layer (cladding) 38 formed on the integration surface 2202 such as to cover the MR device 33, electromagnetic coil device 34, core 35, and near-field light generating part 36.

The magnetic head part 32 further comprises a pair of electrode pads 371, 371 for signal terminals formed on the exposed surface of the insulating layer 38 and connected to respective I/O terminals of the MR device 33, a pair of electrode pads 373, 373 for signal terminals connected to respective ends of the electromagnetic coil device 34, and a grounding electrode pad 375 electrically connected to the slider substrate 220. The electrode pad 375 electrically connected to the slider substrate 220 through a via hole 375a is connected to the electrode pad 247 of the flexure 201 by a bonding wire, whereby the potential of the slider substrate 220 is regulated to the ground potential, for example, by the electrode pad 247.

Respective end faces of the MR device 33, electromagnetic coil device 34, and near-field light generating part 36 are exposed at the medium-opposing surface S. Both ends of the laser diode 40 are connected to the electrode pads 47, 48, respectively.

Figure 4:
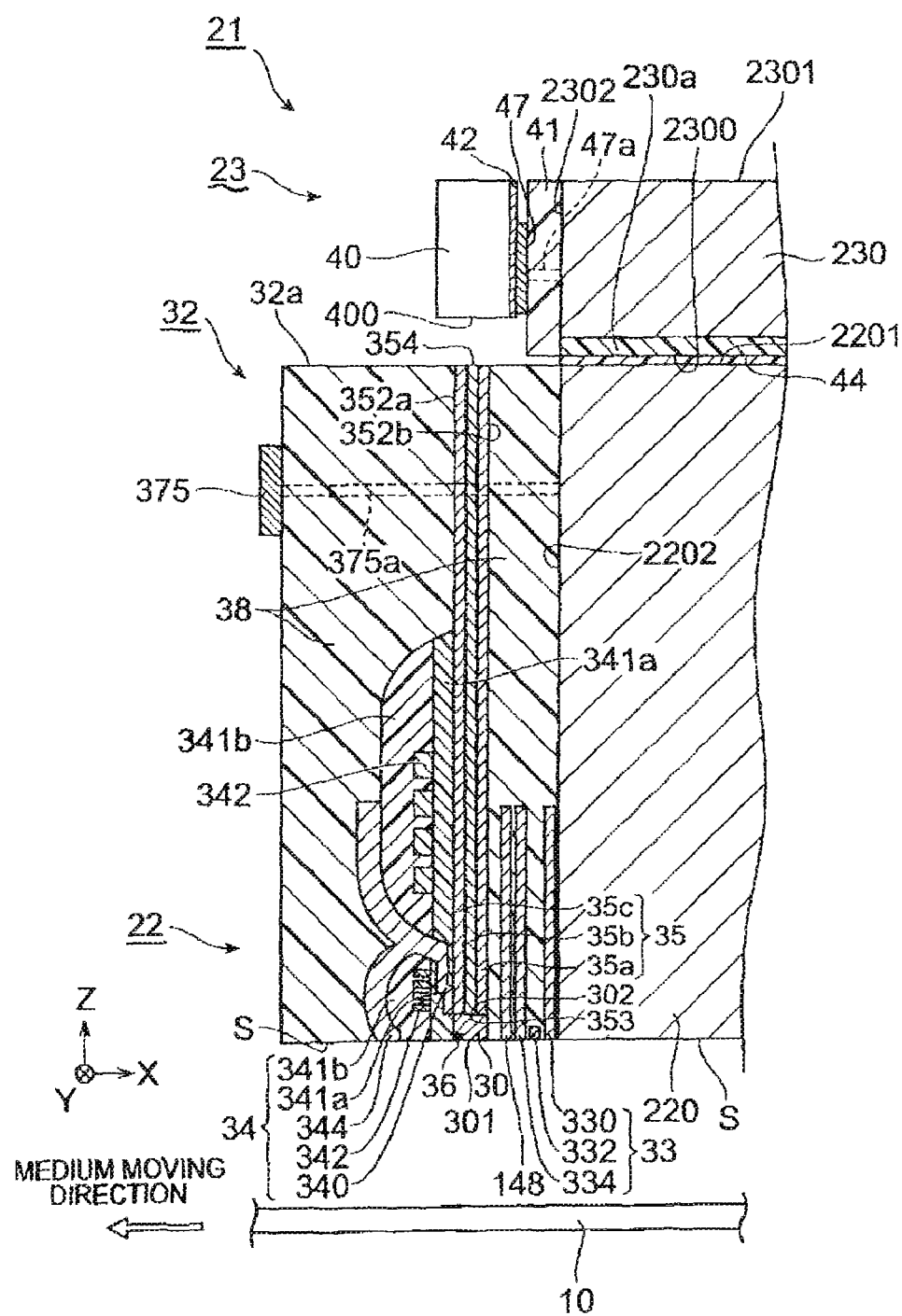
FIG. 4 is a sectional view of the thermally assisted magnetic head 21 taken along the line IV-IV shown in FIG. 3.

FIG. 4 is a sectional view of the thermally assisted magnetic head 21 taken along the line IV-IV of FIG. 3.

The MR device 33 includes an MR multilayer body 332, and a lower shield layer 330 and an upper shield layer 334 which are arranged at respective positions holding the MR multilayer body 332 therebetween. Each of the lower shield layer 330 and upper shield layer 334 can be constituted by a magnetic material such as NiFe, CoFeNi, CoFe, FeN, or FeZrN having a thickness on the order of 0.5 to 3 μm formed by pattern plating including frame plating or the like, for example. The lower and upper shield layers 330 and 334 prevent the MR multilayer body 332 from being affected by external magnetic fields which may cause noises.

The MR multilayer body 332 includes a magnetoresistive film such as current-in-plane (CIP) giant magnetoresistive (GMR) multilayer film, current-perpendicular-to-plane (CPP) GMR multilayer film, or tunneling magnetoresistive (TMR) multilayer film, and senses signal magnetic fields from the magnetic disk with a very high sensitivity.

The multilayer body 332 including a TMR multilayer film, for example, has a structure formed by successively laminating an antiferromagnetic layer having a thickness on the order of 5 to 15 nm made of IrMn, PtMn, NiMn, RuRhMn, or the like; a magnetization pinned layer which is constituted by a ferromagnetic material such as CoFe or two layers of CoFe or the like holding therebetween a nonmagnetic metal layer such as Ru, for example, and has a direction of magnetization fixed by the antiferromagnetic layer; a tunnel barrier layer made of a nonmagnetic dielectric material formed when a metal film having a thickness on the order of 0.5 to 1 nm made of Al, AlCu, or the like is oxidized naturally or by oxygen introduced into a vacuum apparatus, for example; and a free magnetization layer which is constituted by a two-layer film made of CoFe or the like having a thickness of about 1 nm and NiFe or the like having a thickness on the order of 3 to 4 nm which are ferromagnetic materials, for example, and forms a tunneling exchange coupling with the magnetization fixed layer through the tunnel barrier layer.

An interdevice shield layer 148 made of a material similar to that of the lower shield layer 330 is formed between the MR device 33 and core 35. The interdevice shield layer 148 acts to shield the MR device 33 from magnetic fields generated from the electromagnetic coil device 34, thereby preventing external noises from occurring at the time of reading. A backing coil part may further be formed between the interdevice shield layer 148 and core 35. The backing coil part produces a magnetic flux for canceling a magnetic flux loop which travels the upper and lower electrode layers of the MR device 33 after being generated from the electromagnetic coil device 34, so as to suppress the phenomenon of wide adjacent track erasure (WATE) which is an unnecessary writing or erasing action with respect to magnetic disks.

The insulating layer 38 made of alumina or the like is formed between the shield layers 330, 334 on the side of the MR multilayer body 332 opposite from the medium-opposing surface S, on the shield layers 330, 334, 148 on the side opposite from the medium-opposing surface S, between the lower shield layer 330 and slider substrate 220, and between the interdevice shield layer 148 and core 35.

When the MR multilayer body 332 includes a CIP-GMR multilayer film, upper and lower shield gap layers for insulation made of alumina or the like are provided between the MR multilayer body 332 and the upper and lower shield layers 334, 330, respectively. Further, though not depicted, an MR lead conductor layer for supplying the MR multilayer body 332 with a sense current and taking out a reproduced output is formed. When the MR multilayer body 332 includes a CPP-GMR multilayer film or TMR multilayer film, on the other hand, the upper and lower shield layers 334, 330 also function as upper and lower electrode layers, respectively. In this case, the upper and lower shield gap layers and MR lead conductor layer are unnecessary and omitted.

Formed on both sides in the track width direction of the MR multilayer body 332 are hard bias layers (not depicted) made of a ferromagnetic material such as CoTa, CoCrPt, or CoPt for applying a longitudinal bias magnetic field for stabilizing magnetic domains.

The core 35 (first core) of the planar waveguide is constituted by an inner core 35b and outer cores 35a, 35c provided such as to hold the inner core 35b therebetween in the laminating direction (lateral direction of FIG. 4). The core 35 is positioned between the MR device 33 and electromagnetic coil device 34 and extends in parallel with the integration surface (YZ plane) 2202, so as to reach the surface 302 on the side opposite from the medium-opposing surface S of a core 30 (second core) of the waveguide provided on the medium-opposing surface S. The core 35 has an upper face 352a and a lower face 352b which are two surfaces parallel to the integration surface 2202, a light exit surface 353 (first light exit surface) to become an end face on the medium-opposing surface S side, and a light entrance surface 354 on the side opposite from the light exit surface 353. The outer cores 35a, 35c are formed of a material having a refractive index lower than that of the inner core 35b and act as claddings for the inner core 35b. The upper face 352a and lower face 352b of the core 35 are in contact with the insulating layer 38 having a refractive index lower than that of the outer cores 35a, 35c and functioning as a cladding for the core 35.

The core 35 can guide light incident on the light entrance surface 354 after being emitted along the Z axis from the light-emitting surface of the laser diode 40 to the light exit surface (first light exit surface) 353 acting as the end face on the medium-opposing surface S side, while reflecting the light by the upper and lower faces 352a, 352b.

The core 35 is constituted by a dielectric material, formed by using sputtering or the like, for example, having a refractive index n higher than that of the material forming the insulating layer 38 in any part. When the insulating layer 38 acting as the cladding is formed by $SiO_2$ (n=1.5), examples of the combination (A, B) of a material (A) forming the outer cores 35a, 35c and a material (B) forming the inner core 35b include ($Al_2O_3$, $TaO_x$), ($Al_2O_3$, $TiO_x$), ($Al_2O_3$, MgO), and ($Al_2O_3$, $HfO_2$). When the insulating layer 38 is formed by $Al_2O_3$ (n=1.63), examples of the combination (A, B) of the material (A) forming the outer cores 35a, 35c and the material (B) forming the inner core 35b include (MgO, $HfO_2$) ($HfO_2$, $TaO_x$), (MgO, $TaO_x$), (MgO, $TiO_x$), and ($TaO_x$. $TiO_x$). When the core 35 is constituted by such a material, the propagation loss of laser light is reduced not only by favorable optical characteristics of the material itself but also by the fact that a total reflection condition is satisfied at interfaces. The outer cores 35a, 35c may be constructed by materials different from each other as long as they have a refractive index lower than that of the inner core 35b and higher than that of the insulating layer 38. The core 35 may also be constituted by the inner core 35b alone.

The core 30 is positioned between the light exit surface 353 of the core 35 and the medium-opposing surface S. The light enhance surface 302 of the core 30 is in contact with the light exit surface 353 of the core 35, while the light exit surface 301 (second light exit surface) of the core 30 is provided within the medium-opposing surface S. The light exit surface 301 may be positioned deeper (in the Z-axis direction in FIG. 4) than the medium-opposing surface S within a distance by which light from the near-field light generating part, which will be explained later, reaches the magnetic recording medium.

The core 30 can guide the light emitted from the light exit surface 353 of the core 35 from the light entrance surface 302 to the light exit surface 301, while bending it leftward in FIG. 4 (as will be explained later in detail).

The near-field light generating part 36 is a planar member arranged near the left end of the light exit surface 301 of the core 30 in FIG. 4. The near-field light generating part 36 is buried at the light exit surface 301 of the core 30 such as to expose its end face at the medium-opposing surface S. When the near-field light generating part 36 is irradiated with light from the laser diode 40, near-field light is generated. When the near-field light generating part 36 is irradiated with light, electrons within a metal constituting the near-field light generating part 36 vibrate plasmatically, whereby electric fields concentrate at its leading end part. The spread of this near-field light is about the same as the radius of the leading end part of the near-field light generating part. Therefore, reducing the radius of the leading end part to a track width or shorter is effective in that the emitted light is simulatively narrowed to a diffraction limit or less.

The electromagnetic coil device 34, which is preferably one for perpendicular magnetic recording, comprises a main magnetic pole (layer) 340, a gap layer 341a, a coil insulating layer 341b, a coil layer 342, and an auxiliary magnetic pole layer 344 as shown in FIG. 4. The main magnetic pole 340, which is a magnetoconductive path for guiding the magnetic flux induced by the coil layer 342 to the recording layer of a magnetic disk (medium) to be written while converging it, extends from the spiral center of the coil layer 342 toward the medium-opposing surface S. When the coil layer 342 is energized, a magnetic field is guided through the main magnetic pole 340 to its leading end on the medium-opposing surface S side, whereby a writing magnetic field can be generated from the leading end.

The end part on the medium-opposing surface S side of the auxiliary magnetic pole 344 magnetically coupled to the main magnetic pole 340 forms a trailing shield part having a layer cross section wider than that in the remaining part of the auxiliary magnetic pole 344. The auxiliary magnetic pole 344 substantially opposes the end part on the medium-opposing surface S side of the main magnetic pole 340 through a gap layer (cladding) 341a and a coil insulating layer 341b which are formed by an insulating material such as alumina. When such an auxiliary magnetic pole 344 is provided, the magnetic field gradient becomes steeper between the auxiliary magnetic pole 344 and main magnetic pole 340 in the vicinity of the medium-opposing surface S. As a result, jitter becomes smaller in signal outputs, whereby the error rate can be lowered at the time of reading.

The auxiliary magnetic pole 344 is constituted by an alloy made of two or three of Ni, Fe, and Co formed by frame plating, sputtering, or the like, for example, an alloy mainly composed of them and doped with a predetermined element, or the like having a thickness of about 0.5 to about 5 μm, for example.

The gap layer 341a, which separates the coil layer 342 and main magnetic pole 340 from each other, is constituted by $Al_2O_3$, DLC, or the like formed by sputtering, CVD, or the like, for example, having a thickness of about 0.01 to about 0.5 μm, for example.

The coil layer 342 is constituted by Cu or the like formed by frame plating or the like, for example, having a thickness of about 0.5 to about 3 μm, for example. The rear end of the main magnetic pole 340 and the part of the auxiliary magnetic pole layer 344 remote from the medium-opposing surface S are joined to each other, while the coil layer 342 is formed such as to surround this joint.

The coil insulating layer 341b, which separates the coil layer 342 and auxiliary magnetic pole layer 344 from each other, is constituted by an electrically insulating material such as thermally cured alumina or resist layer having a thickness of about 0.1 to about 5 μm, for example.

Figure 5:
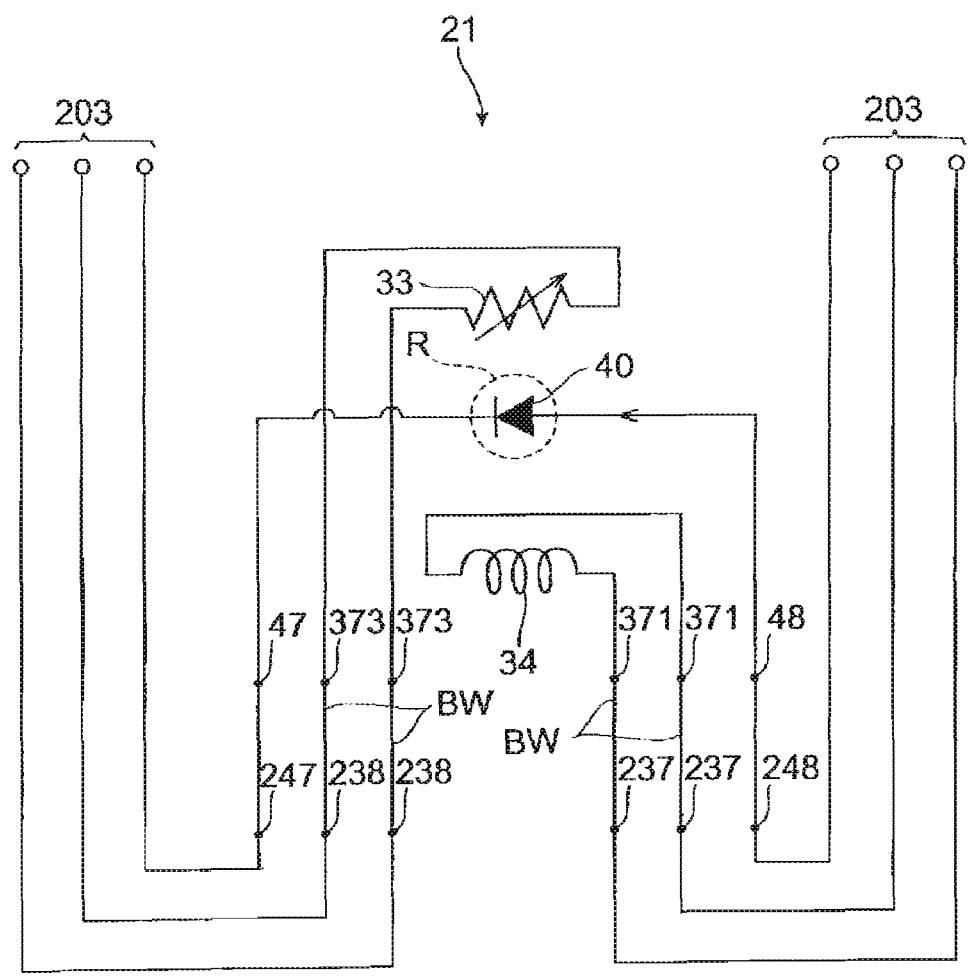
FIG. 5 is a circuit diagram of the thermally assisted magnetic head 21.

FIG. 5 is a circuit diagram of the thermally assisted magnetic head 21.

One of leads constituting the wiring members 203 is electrically connected to the cathode of the laser diode 40 through the electrode pads 247 and 47, whereas another lead is electrically connected to the anode of the laser diode 40 through the electrode pads 248 and 48. When a driving current is supplied between the electrode pads 247 and 248, the laser diode 40 emits light. This light irradiates the recording area of the magnetic recording medium through the cores 35, 30 and medium-opposing surface S (see FIG. 4).

Another pair of leads constituting the wiring members 203 are connected to respective ends of the electromagnetic coil device 34 through the electrode pads 237, bonding wires BW, and electrode pads 371. When a voltage is applied between a pair of electrode pads 237, the electromagnetic coil device 34 as a magnetic recording device is energized, whereby a writing magnetic field occurs. In the thermally assisted magnetic head 21, the light emitted from the laser diode 40 is made incident on the light entrance surface 354 of the core 35 and then is emitted form the light exit surface 301 provided at the medium-opposing surface S, so as to irradiate the recording area of the magnetic recording medium (see FIG. 4). This raises the temperature of the recording area in the magnetic recording medium opposing the medium-opposing surface S, thereby temporarily lowering the coercivity of the recording area. When the electromagnetic coil device 34 is energized during this coercivity-decreasing period, so as to generate a writing magnetic field, information can be written in the recording area.

Another pair of leads constituting the wiring members 203 are connected to respective ends of the MR device 33 through the electrode pads 238, bonding wires BW, and electrode pads 373. When a voltage is applied between a par of electrode pads 238, a sense current flows through the MR device 33. The information written in the recording area can be read when a sense current is caused to flow through the MR device 33.

Figure 6:
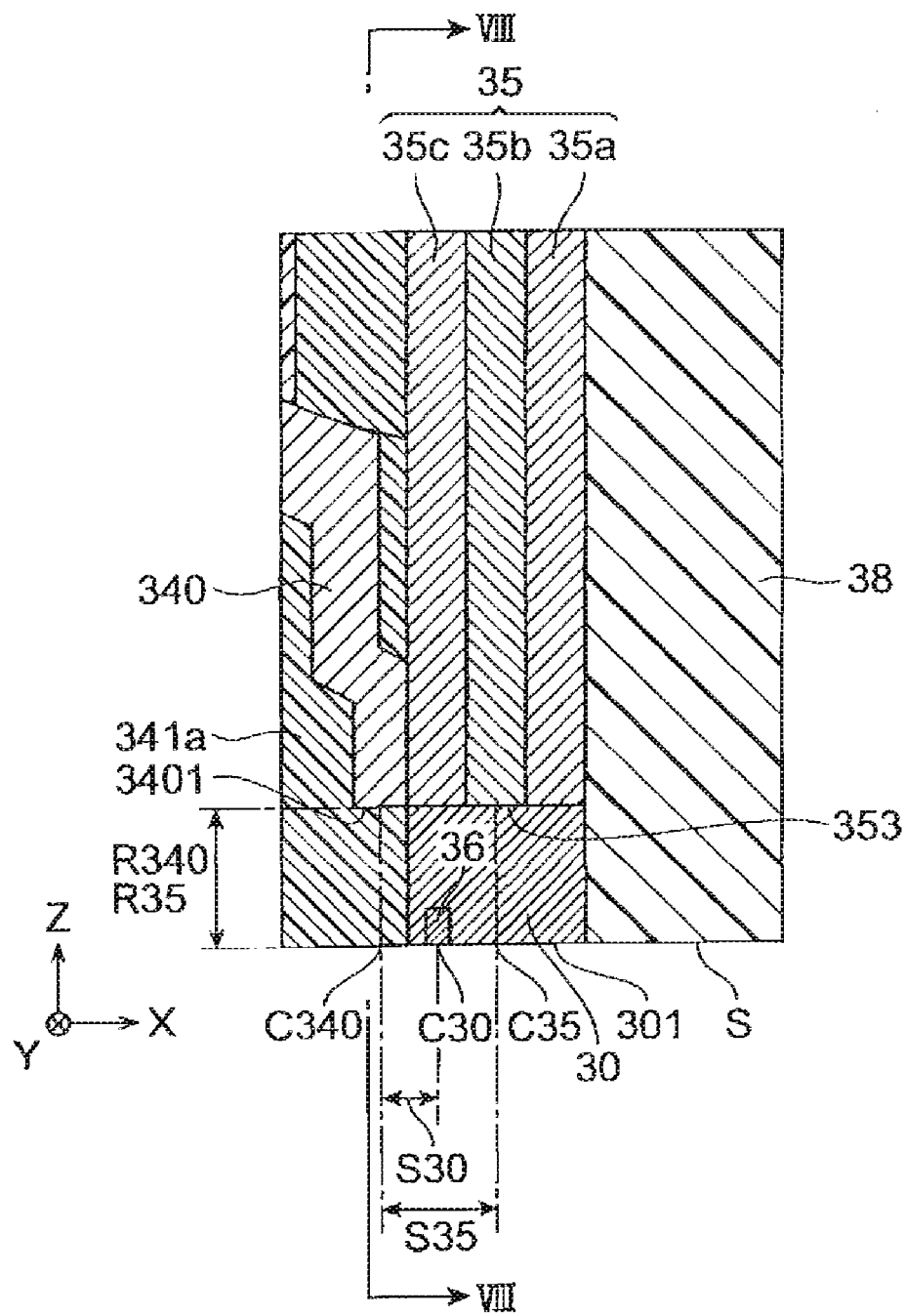
FIG. 6 is an enlarged sectional view of a core 35 and its vicinity shown in FIG. 4.
Figure 7:
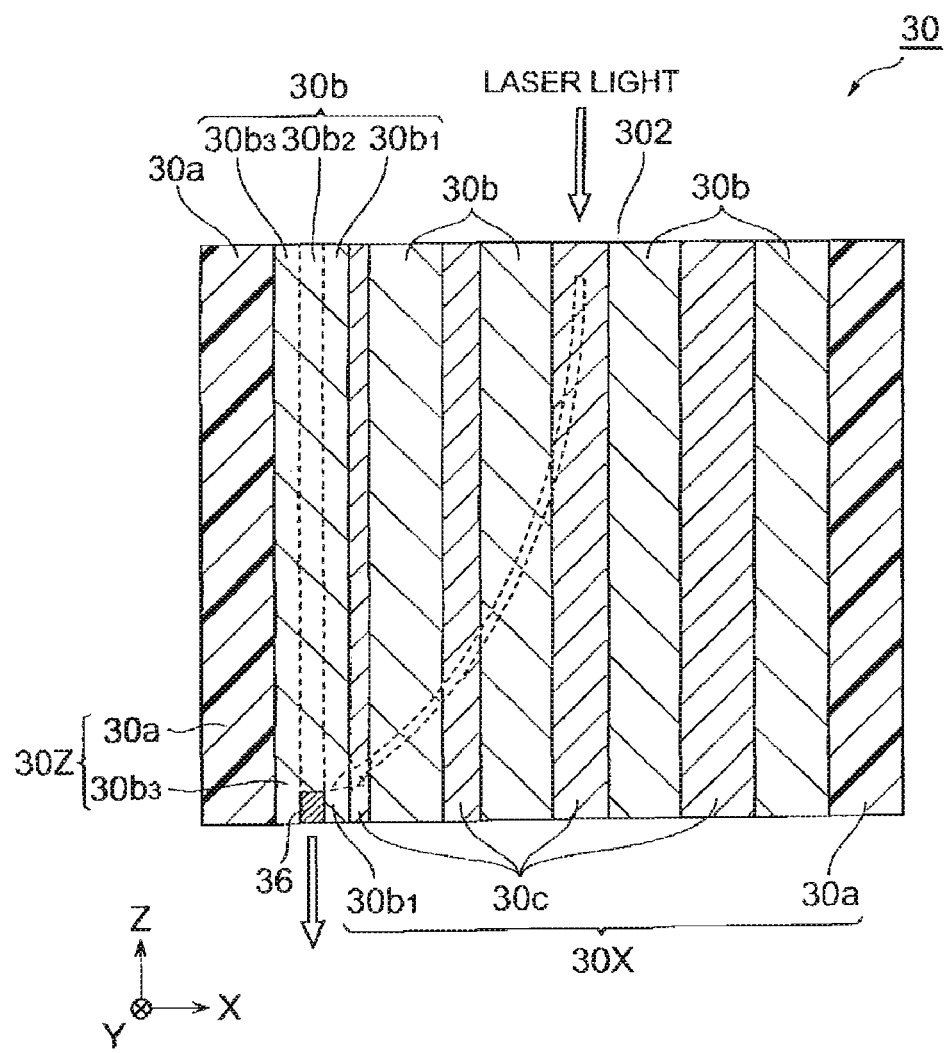
FIG. 7 is an enlarged sectional view of a core 30 shown in FIG. 6.
Figure 8:
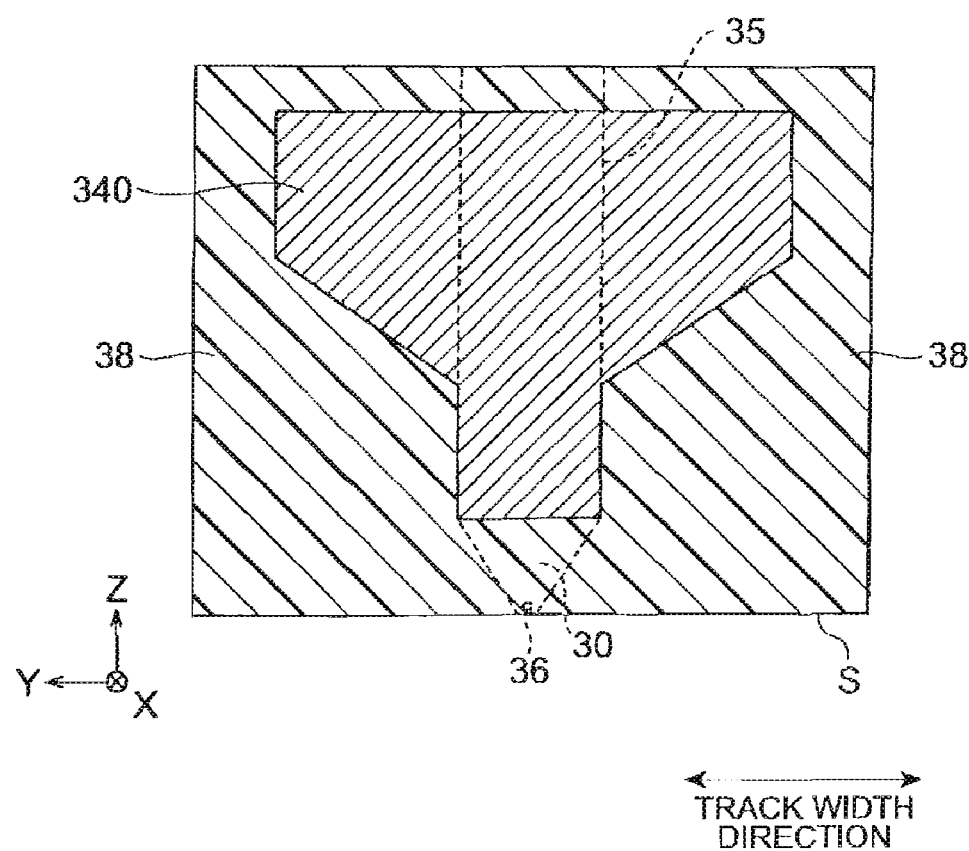
FIG. 8 is a sectional view taken along the line VIII-VIII of FIG. 6.

With reference to FIGS. 6 to 8, the structures of the main magnetic pole 340 and cores 35 and 30 in this embodiment will now be explained in detail.

FIG. 6 is an enlarged view of the main magnetic pole layer 340 and its vicinity in the sectional view of FIG. 4, whereas FIG. 7 is a view further enlarging the core 30 and its vicinity. As shown in FIG. 6, the leading end 3401 of the main magnetic pole 340 is deeper (in the Z-axis direction of FIG. 6) by a distance R340 than the medium-opposing surface S, while the light exit surface 353 of the core 35 is deeper by a distance R35 than the medium-opposing surface S. R340 and R35 are identical in terms of magnitude in this embodiment but may differ from each other. R340 (or R35) may be 0.3 to 1.2 μm, for example, whereby the light can be guided in front of the main magnetic pole 340.

The core 30, which is positioned between the light exit surface 353 of the core 35 and the medium-opposing surface S, has the light entrance surface 302 in contact with the light exit surface of the core 35 and the light exit surface 301 on the side opposite from the light entrance surface 302. The near-field fight generating part 36 is provided in the vicinity off the left end part of the light exit surface 301.

As shown in FIG. 7, the core 30 is made of a plurality of kinds of materials laminated in the X-axis direction of this drawing. Specifically first low refractive index layers 30a are formed on both end faces in the X-axis direction, while high refractive index layers 30b and second low refractive index layers 30c are alternately formed between the former layers. Their materials have respective refractive indexes different from each other and are selected such that the first low refractive index layers 30a attain the lowest refractive index while the high refractive index layers 30b attain the highest refractive index.

Though the high refractive index layers 30b have the same thickness, the second low refractive index layers 30c gradually reduce their thickness toward the left side of FIG. 7. Therefore, the ratio of the high refractive index layers 30b per unit thickness increases toward the left side of FIG. 7 in the core 30, whereby the average refractive index (effective refractive index) of partial regions taken into account in the core 30 gradually increases toward the left side of FIG. 7 (direction from the core 35 side to the main magnetic pole 340 side in the core 30). As a consequence, the light incident on the light entrance. Reface 302 of the core 30 is directed to the light exit surface 301 while gradually bending toward the left side in FIG. 7, so as to irradiate the near-field light generating part 36 provided near the left end of the light exit surface 301.

Preferred as the first low refractive index layer 30a from the viewpoint of preventing the light incident on the light entrance surface 302 from escaping laterally in FIG. 7 are those having a low refractive index, for which $Al_2O_3$ and $S_iO_2$, for example, may be used. Examples of the combination (A, B) of the high refractive index layer 30b (A) and second low refractive index layer 30c (B) include ($TaO_x$, $Al_2O_3$), (MgO, $Al_2O_3$), and ($TaO_x$, MgO).

Though the high refractive index layers 30b have the same thickness in this embodiment, it will be sufficient if the thicknesses of the high refractive index layers 30b aid second low refractive index layers 30c are selected such as to increase the effective refractive index toward the left side in FIG. 7. This embodiment is advantageous in that the structure of the core 30 is simple, since the core 30 is formed by alternately laminating the high refractive index layers 30b and second low refractive index layers 30c. Instead of such a structure, however, a structure whose composition continuously changes toward the left side in FIG. 7 so as to continuously increase the refractive index may be employed, for example. A structure providing no first low refractive index layers 30a in particular is also possible.

The above-mentioned effects of the core 30 can bring the center of the intensity distribution of the light irradiating the magnetic recording medium and the center of the intensity distribution of the magnetic field applied to the magnetic recording medium closer to each other. Namely, when light is emitted from the core 35 in FIG. 6, the center of the intensity distribution of the light is located at the center of the light exit surface 353. When light is emitted from the core 30, the center of the intensity distribution of the light is located at the position where the near-field light generating part 36 is provided in the light exit surface 301. When a magnetic field is applied from the main magnetic pole to the magnetic recording medium, the center of the intensity distribution of the magnetic field is the center of the leading end 3401 of the main magnetic pole 340. The center of an optical intensity distribution refers to a position yielding a peak intensity, while the center of the leading end refers to the center of gravity of a two-dimensional form of the leading end.

Respective points at which the center of the optical intensity distribution of the light exit surface 353, the center of the optical intensity distribution of the light exit surface 301, and the center of the leading end of the main magnetic pole are orthographically projected onto the reference plane S (referred to with the same letter as that of the medium-opposing surface S since the light exit surface 301 is provided within the medium-opposing surface S) including the light exit surface 301 are referred to as C35, C30, and C340. In this embodiment, S30, which is the distance from C30 to C340, is shorter than S35, which is the distance from C35 to C340. In other words, the distance S35 is longer tin the distance S30.

FIG. 8 is a sectional view taken along the line VIII-VIII of FIG. 6. The main magnetic pole 340 is formed such that the width in the track width direction of the leading end part on the medium-opposing surface S side is narrower than the width of the base end part on the side opposite from the medium-opposing surface S, thereby focusing the magnetic field induced by the coil layer 342 (see FIG. 4) and applying it to the recording area of the magnetic recording medium. The core 30 gradually narrows the width in the track width direction toward the medium-opposing surface S, thereby exhibiting a tapered form. This makes it possible to focus the light propagating through the core 30 and irradiate the near-field light generating part 36 therewith so as to generate near-field light with a high intensity.

Figure 9:
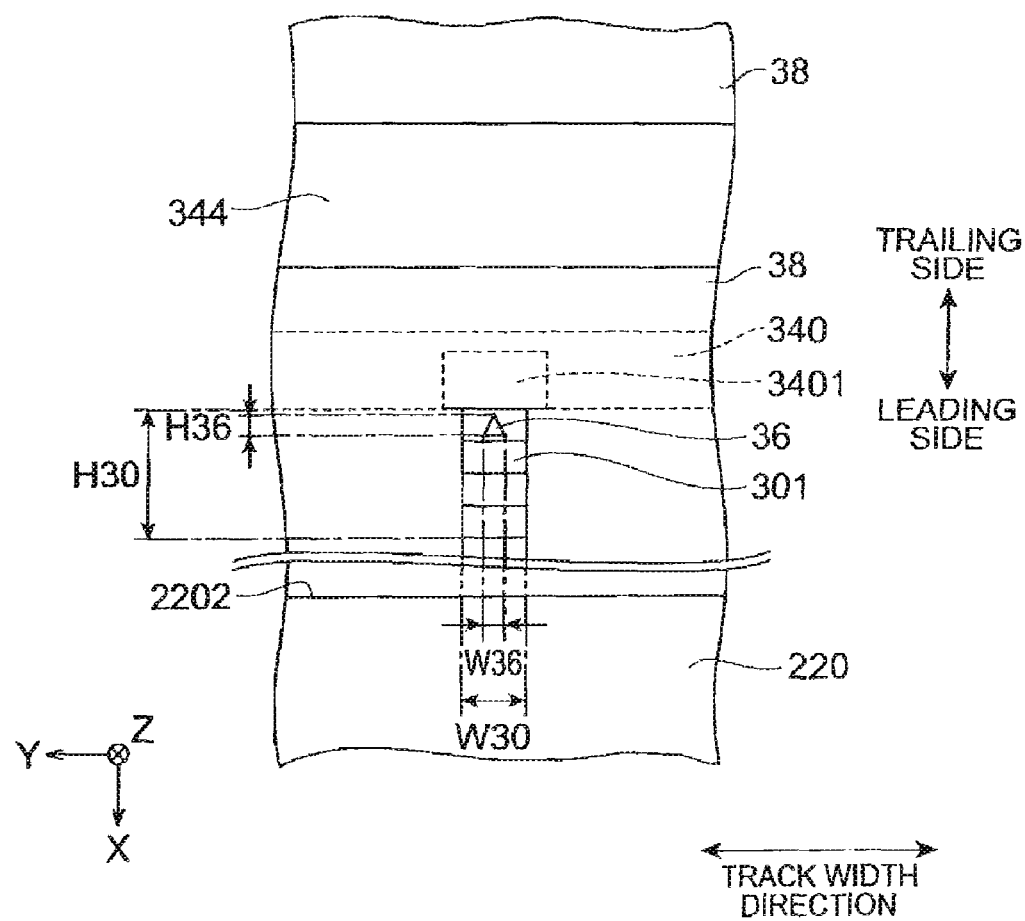
FIG. 9 is a plan view of a magnetic head main part as seen from the medium-opposing surface side.

FIG. 9 is a plan view of a magnetic head main part as seen from the medium-opposing surface S side. When seen from the medium-opposing surface S side, as shown in FIG. 9, the positions of the light exit surface 301 and the leading end 3401 of the main magnetic pole 340 are located close to each other in a direction (bit length direction) perpendicular to the track width. Hence, the position provided with the near-field light generating part 36 acting as the center of the intensity distribution of the light emitted from the light exit surface 301 and the leading end 3401 of the main magnetic pole 340 are located very close to each other in the bit length direction.

The light exit surface 301 of the core 30 may have a width W30 of 0.4 to 5.0 μm, for example, in the track width direction and a length H30 of 0.8 to 5.0 μm, for example, in the bit length direction.

Preferably, the main magnetic pole layer 340 is constituted by an alloy made of two or three of Ni, Fe, and Co formed by frame plating, sputtering, or the like, for example, an alloy mainly composed of them and doped with a predetermined element, or the like.

Figure 10:
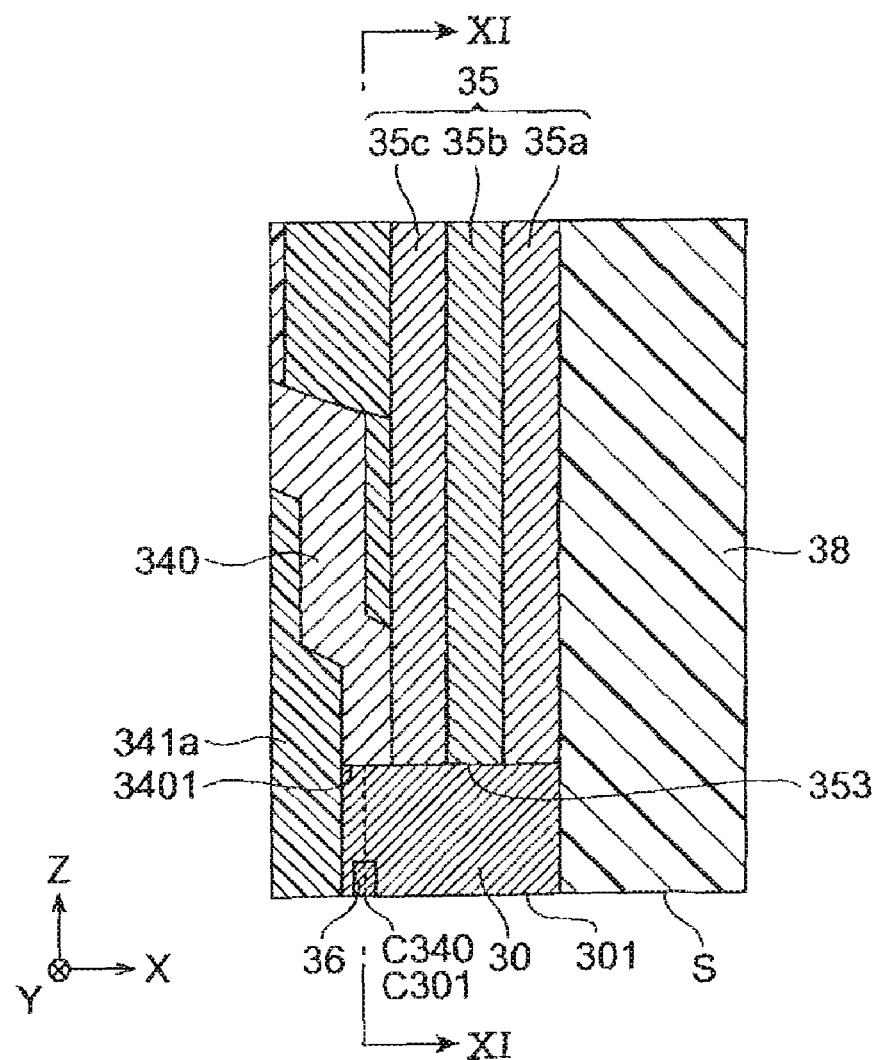
FIG. 10 is an enlarged sectional view of the core 35 and its vicinity in a modified example of the first embodiment.
Figure 11:
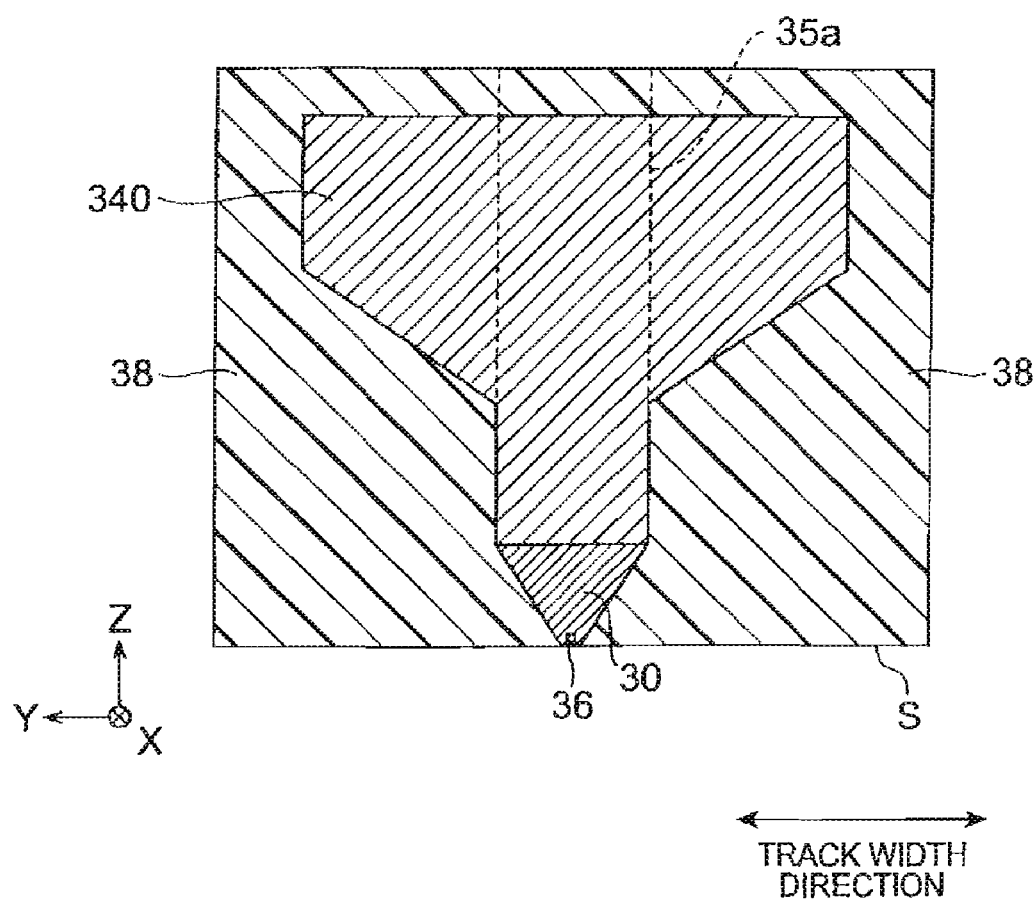
FIG. 11 is a sectional view taken along the line XI-XI of FIG. 10.
Figure 12:
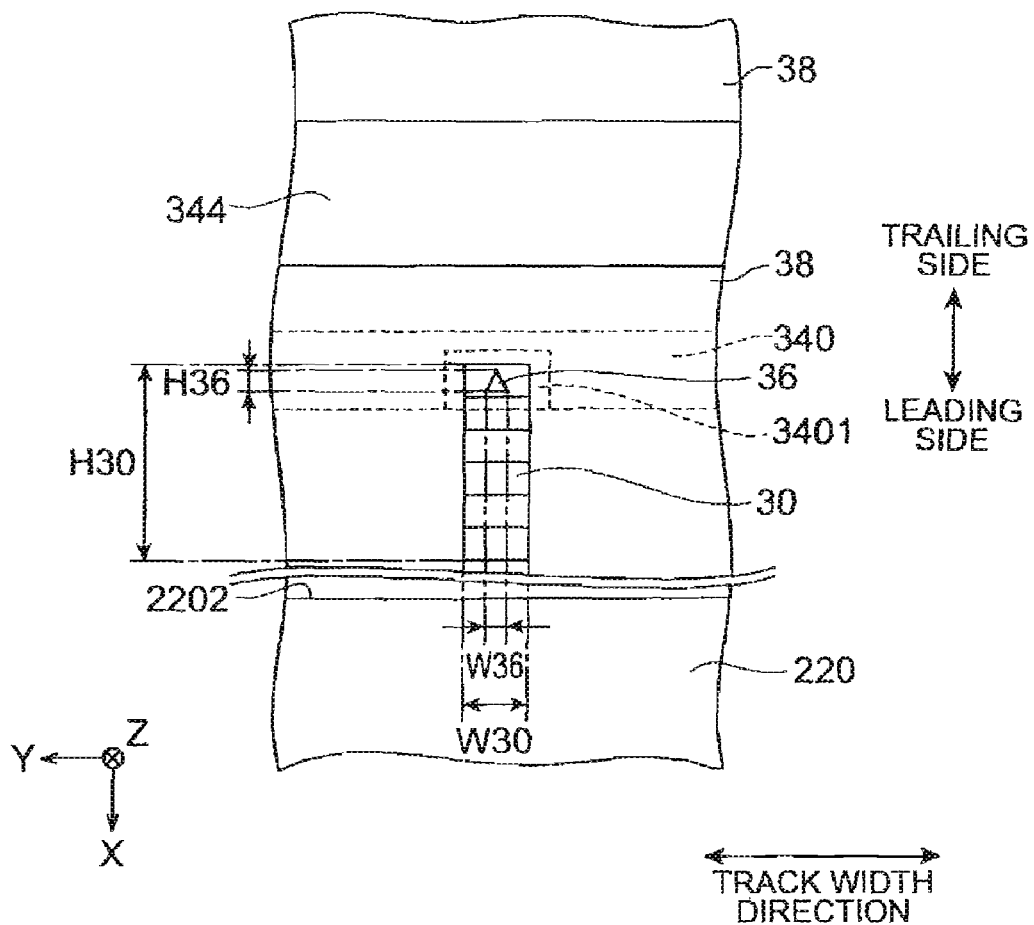
FIG. 12 is a plan view of the magnetic head main part in the modified example of the first embodiment as seen from the medium-opposing surface side.
Figure 13:
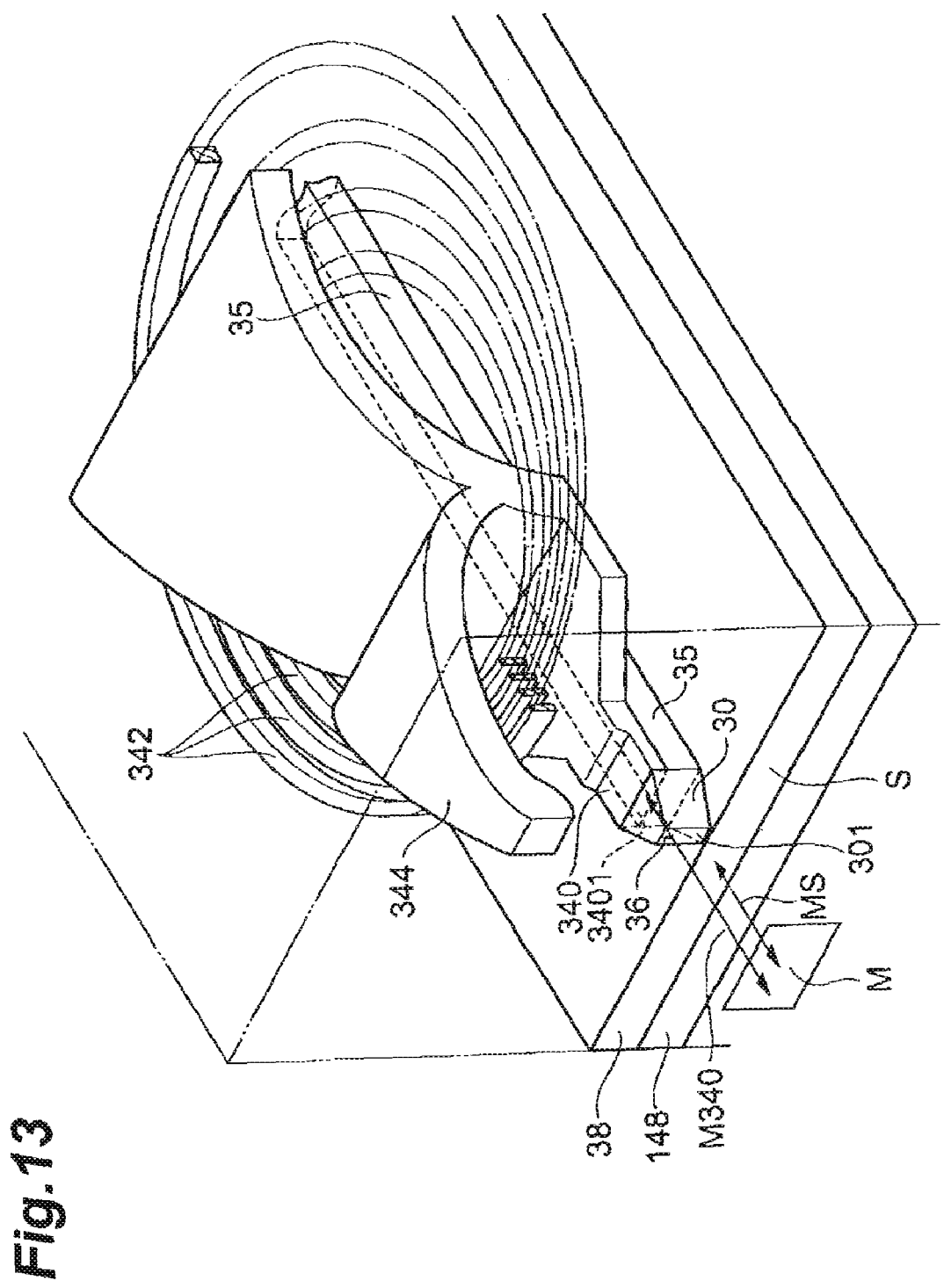
FIG. 13 is a perspective view of a magnetic head part 32 in the modified example of the first embodiment as seen from the medium-opposing surface side.

A modified example of this embodiment will now be explained with reference to FIGS. 10 to 13. FIG. 10 is an enlarged view of the main magnetic pole layer 340 and its vicinity and corresponds to FIG. 6, while FIG. 11 is a sectional view taken along the line XI-XI of FIG. 10. FIG. 12 is a plan view of the magnetic head main part in the modified example as seen from the medium-opposing surface S side, while FIG. 13 is a perspective view of the magnetic head part 32 in the modified example as seen from the medium-opposing surface side.

This modified example differs from the above-mentioned embodiment only in terms of the position and form of the core 30. Namely, as shown in FIGS. 10 to 13, the core 30 is provided not only between the light exit surface 353 of the core 35 and the medium-opposing surface S but also between the leading end 3401 of the min magnetic pole 340 and the medium-opposing surface S. Therefore, as shown in FIG. 10, the positions of C301 and C340, which are points where the center of the light intensity distribution of the light exit surface 301 and the center of the leading end 3401 of the main magnetic pole 340 are orthographically projected onto the reference plane S, can substantially coincide with each other. As shown in FIG. 12, the position of the leading end 3401 of the main magnetic pole 340 overlaps the position of the light exit surface 301 in this modified example when seen from the medium-opposing surface S side. Hence, the position at which the center of the leading end 3401 of the main magnetic pole 340 is orthographically projected onto the reference plane S can substantially coincide with the position of the near-field light generating part 36 within the light exit surface 301.

The distance M340 from the leading end 3401 of the main magnetic pole 340 to the magnetic recording medium M is set longer than the distance MS from the medium-opposing surface S opposing the magnetic recording medium M to the magnetic recording medium M, i.e., the main magnetic pole 40 is positioned deeper in the head, whereby the distance R340 (or R35) is set as mentioned above.

The foregoing thermally assisted magnetic head 21 comprises the slider substrate 220 having the medium-opposing surface S, the first surface 2201 positioned on the side opposite from the medium-opposing surface S, and side faces positioned between the medium-opposing surface S and first surface 2201; the magnetic head part 32, secured to one of the side faces of the slider substrate 220, including the core 35 having the light entrance surface 354 on the side opposite from the medium-opposing surface S, the core 30 having the light entrance surface 302 in contact with the light exit surface 353 of the core 35 and the light exit surface 301 on the medium-opposing surface S side, and the magnetic recording device 34 located close to the light exit surface 301; the light source support substrate 230 having the second surface 2300 secured to the first surface 2201; and the light-emitting device 40, secured to the light source support substrate 230, opposing the light entrance surface 354 of the core 35 (see FIG. 4).

The laser diode 40 is secured to the light source support substrate 230, while the first surface 2201 of the slider substrate 220 is secured to the second surface 2300 of the fight source support substrate 230, whereby the slider substrate 220 and laser diode 40 attain a fixed positional relationship therebetween. Since the laser diode 40 opposes the light entrance surface 354 of the core 35, the light emitted from the light-emitting device is not propagated over a long distance as in the conventional cases, but can be guided to the medium-opposing surface while tolerating attachment errors and optical coupling losses.

Figure 14:
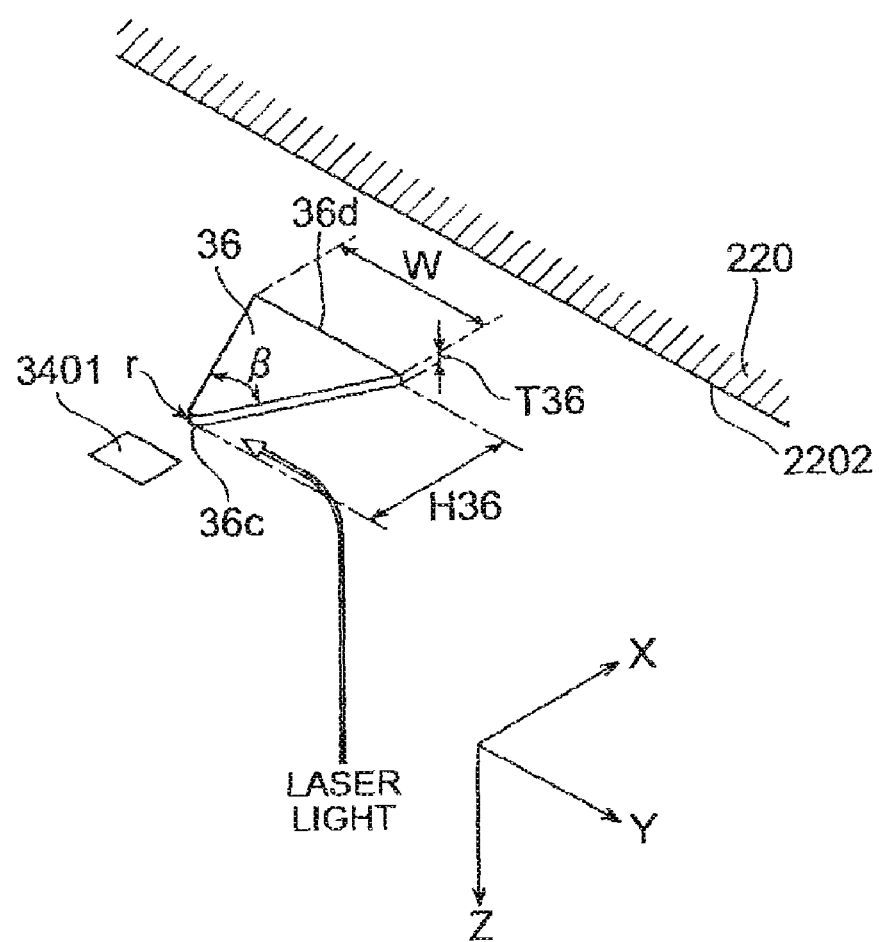
FIG. 14 is a perspective view of a near-field light generating part 36 as seen from a medium-opposing surface S.

FIG. 14 is a perspective view of the near-field light generating part 36 as seen from the medium-opposing surface S.

The near-field light generating part 36 has a triangular form as seen from the medium-opposing surface S and is formed from a conductive material. The base 36d of the triangle is arranged parallel to the integration surface 2202 of the slider substrate 220, i.e., parallel to the track width direction, while the vertex 36c facing the base 36d is arranged on the side of the base 36d opposite from the integration surface 2202. A preferred mode of the near-field light generating part 36 is all isosceles triangle having two base angles identical to each other at both ends of the base 36d.

Preferably, the vertex 36c of the near-field light generating part 36 has a radius of curvature r of 5 to 100 nm. The height H36 of the triangle is sufficiently smaller than the wavelength of the incident laser light, and is preferably 20 to 400 nm. The width W of the base 36d is sufficiently smaller than the wavelength of the incident laser light, and is preferably 20 to 400 nm. The vertex 36c has an angle of β of 60 degrees, for example.

Preferably, the thickness T36 of the near-field light generating part 36 is 10 to 100 nm.

When the light exit surface 301 of the core 30 is provided with such a near-field light generating part 36, an electric field is focused near the vertex 36c of the near-field light generating part 36, thereby generating, near-field light from the vicinity of the vertex 36c toward the medium.

Though dependent on the wavelength of laser light and the form of the core 35, the near-field light has the highest intensity at boundaries of the near-field light generating part 36 as seen from the medium-opposing surface S in general. In particular, the electric field vector of the light reaching the near-field light generating part 36 hies in the laminating direction (X direction) of the laser diode 40 in this embodiment. Therefore, the strongest radiation of near-field light occurs in the vicinity of the vertex 36c. Namely, in a thermally assisted action for heating the recording layer part of the magnetic disk with light, the part opposing the vicinity of the vertex 36c becomes a main part of the heating action.

The electric field intensity of the near-field light is incommensurably stronger than that of incident light. This very strong near-field light rapidly heats its opposing local part of the magnetic disk surface. As a consequence, the coercivity of the local part decreases to such a magnitude as to enable writing by the writing magnetic field, whereby the writing by the electromagnetic coil device 34 is possible even when a magnetic disk having a high coercivity for high-density recording is used. There, the near-field light is directed from the medium-opposing surface S to the surface of the magnetic disk and reaches a depth of about 10 to 30 nm therein. Since the amount of levitation is currently 10 nm or less, the near-field light can sufficiently reach the recording layer part. Each of the widths in the track width direction and medium moving direction of thus generated near-field light is on a par with the above-mentioned depth reached by the near-field light, while the electric field intensity of the near-field light decays exponentially as the distance is longer, whereby the recording layer part of the magnetic disk can be heated very locally.

Figure 15:
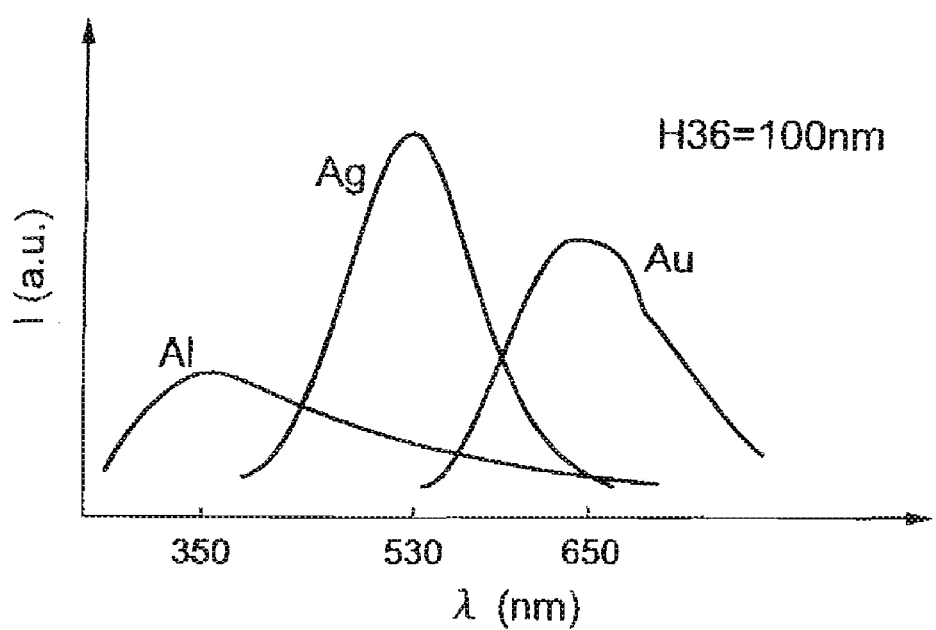
FIG. 15 is a graph showing relationships between the wavelength λ (nm) of light incident on the near-field light generating part 36 and near-field light intensity I (a. u.)

FIG. 15 is a graph showing relationships between the wavelength λ (nm) of light incident on the near-field light generating part 36 and near-field light intensity I (a. u.). Here, the length H36 of the near-field light generating part 36 is 100 nm.

The near-field light has intensity peaks near incident light wavelengths λ (nm) of about 350 nm, about 530 nm, and about 650 nm when Al, Ag, and Au are used as the near-field light generating part 36, respectively. Cu, Pd, Pt, Rh, and Ir may be used as materials for the near-field light generating part 36 in addition to Al, Ag, and Au. Alloys made of some combinations of these metal materials may also be employed as materials for the near-field light generating part 36.

Figure 16:
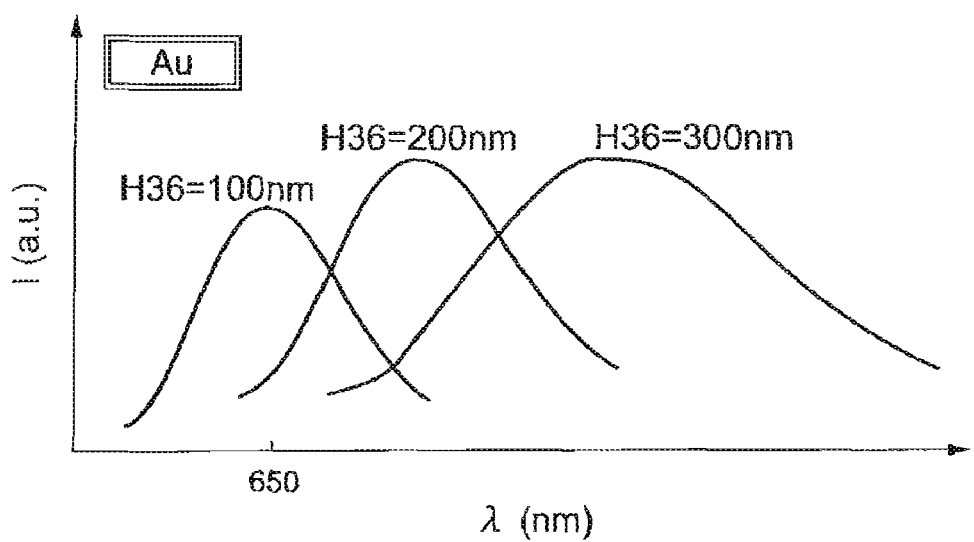
FIG. 16 is a graph showing relationships between the wavelength λ (nm) of light incident on the near-field light generating part 36 and near-field light intensity I (a. u.)

FIG. 16 is a graph showing relationships between the wavelength λ (nm) of light incident on the near-field light generating part 36 and near-field light intensity I (a. u.). Here, the material for the near-field light generating part 36 is Au, while the length H36 is 100 nm, 200 nm, and 300 nm. While the length H36 is preferably 20 to 400 nm, the half width of the spectrum tends to be narrower when light having a shorter wavelength is incident, so that the tolerance of near-field light intensity change becomes higher with respect to fluctuations in incident light wavelength.

Light Source Unit

Referring to FIGS. 3 and 4 again, constituents of the light source unit 23 of the thermally assisted magnetic head 21 will now be explained.

The light source unit 23 mainly comprises the light source support substrate 230 and the laser diode light-emitting device 40 having a planar outer shape.

The light source support substrate 230 is a substrate made of AlTiC ($Al_2O_3$—TiC) or the like and has the bonding surface 2300 attached to the back face 2201 of the slider substrate 220. The bonding surface 2300 is formed with a heat insulating layer 230a made of alumina or the like. An insulating layer 41 formed from an insulating material such as alumina is provided on a device forming surface 2302 which is one of side faces when the bonding surface 2300 is defined as the bottom face. The electrode pads 47, 48 are formed on the insulating layer 41, while the laser diode 40 is secured onto the electrode pad 47.

For driving the laser, the electrode pads 47, 48 are formed on the surface 411 of the insulating layer 41 intersecting the medium-opposing surface S, i.e., on the surface 411 parallel to the integration surface 2202 of the slider substrate 220.

As shown in FIG. 4, the electrode pad 47 is electrically connected to the light source support substrate 230 through a via hole 47a provided in the insulating layer 41. The electrode pad 47 also functions as a heatsink for dissipating the heat toward the light source support substrate 230 through the via hole 47a at the time of driving the laser diode 40.

As shown in FIG. 3, the electrode pad 47 is formed at the center part of the surface 411 of the insulating layer 41 such as to extend in the track width direction. On the other hand, the electrode pad 48 is formed at a position separated in the track width direction from the electrode pad 47. The electrode pads 47, 48 further extend toward the flexure 201 for connection therewith by solder reflow.

The electrode pads 47, 48 are electrically connected to the electrode pads 247, 248 of the flexure 201, respectively, by solder reflow, whereby the light source can be driven. Since the electrode pad 47 is electrically connected to the light source support substrate 230 as mentioned above, the potential of the light source support substrate 230 can be regulated to the ground potential, for example, by the electrode pad 247.

Each of the electrode pads 47, 48 may be formed, for example, by a layer of Au, Cu, or the like having a thickness on the order of 1 to 3 μm formed by vacuum deposition, sputtering, or the like by way of a foundation layer made of Ta, Ti, or the like having a thickness of about 10 nm, for example.

The laser diode 40 is electrically connected onto the electrode pad 47 by a solder layer 42 (see FIG. 4) made of a conductive solder material such as Au—Sn. Here, the laser diode 40 is arranged with respect to the electrode pad 47 such as to cover only a part thereof.

Figure 17:
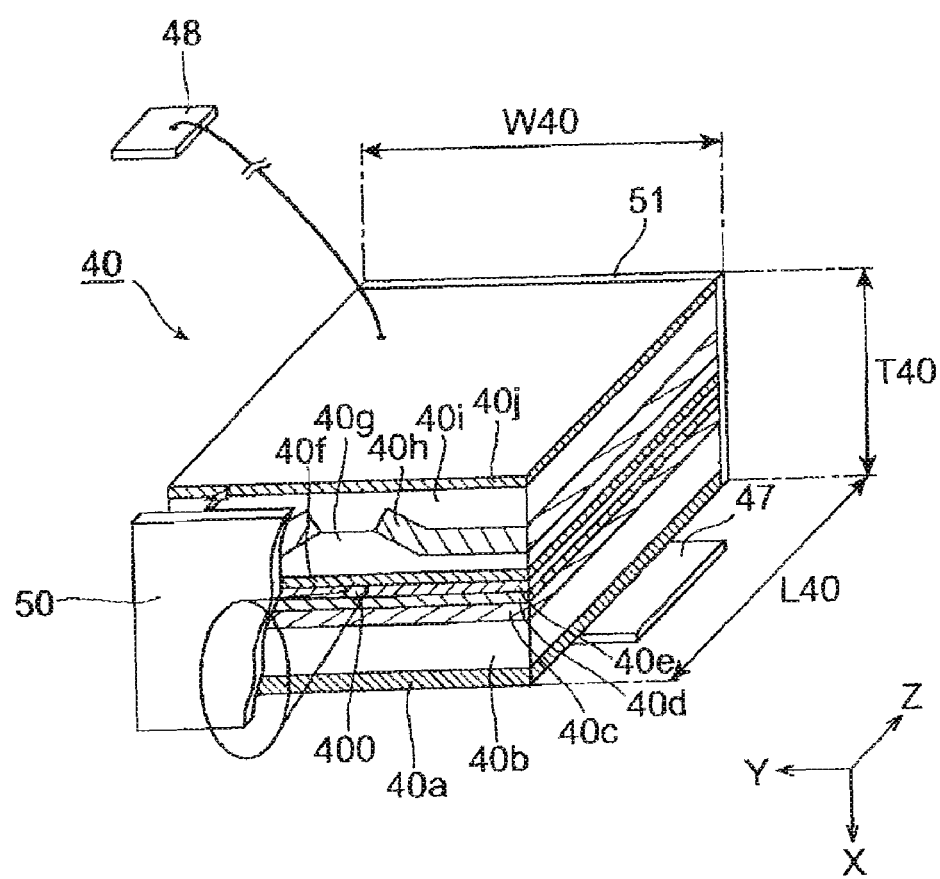
FIG. 17 is a perspective view of a light-emitting device 40.

FIG. 17 is a perspective view of the light-emitting device 40.

The light-emitting device laser diode) 40 may typically have the same structure as that of one used for optical disk storage. An example of the structure is one in which an n-electrode 40a, an n—GaAs substrate 40b, an n-InGaAlP cladding layer 40c, a first InGaAlP guide layer 40d, an active layer 40e made of a multiple quantum well (InGaP/InGaAlP) or the like, a second InGaAlP guide layer 404, a p—InGaAlP cladding layer 40g, an *n—GaAs current blocking layer 40h, a p—GaAs contact layer 40i, and a p-electrode 40j are successively laminated. Reflective films 50 and 51 made of $SiO_2$, $Al_2O_3$, or the like for pumping oscillations by total reflection are formed on the front and rear sides of a cleavage surface of the multilayer structure. A light exit end 400 for emitting the laser light is provided with an opening at the position of the active layer 40e in one reflective film 50. When a voltage is applied to such a light-emitting device 40 in the film thickness direction, the laser light is emitted from the light exit end 400.

The emitted laser light has a wavelength λL on the order of 600 to 650 nm, for example. It must be noted that an appropriate pumping wavelength for the metal material of the near-field light generating part 36 exist. When Au is used as the near-field light generating part 36, for example, the wavelength λL of laser light is preferably about 600 nm.

The light-emitting device 40 is dimensioned such as to have a width (W40) on the order of 200 to 350 μm, a length (depth; L40) on the order of 250 to 600 μm, and a thickness (T40) on the order of 60 to 200 μm, for example, as mentioned above. Here, the width W40 of the light-emitting device 40 can be reduced to about 100 μm, for example, while its lower limit is the gap between the opposing ends of the current blocking layer 40h. However, the length of the light-emitting device 40 is an amount related to the current density and thus cannot be made so small. At any rate, it will be preferred if a considerable dimension is secured for the light-emitting device 40 in view of its handling at the time of mounting.

For driving the light-emitting device 40, a power supply in the hard disk drive may be used. In practice, the hard disk drive is typically equipped with a power supply of about 2 V, for example, which yields a voltage sufficient for laser oscillating operations. The power consumption of the light-emitting device 40 is on the order of several tens of mW, for example, which can be fulfilled by the power supply thin the hard disk drive.

The n-electrode 40*a* of the light-emitting device 40 is secured to the electrode pad 47 by the solder layer 42 of AuSn or the like (see FIG. 4). Here, the light-emitting device 40 is secured to the light source support substrate 230 such that the light exit end (light exit surface) 400 of the light-emitting device 40 faces down in FIG. 4 (in the −Z direction), i.e., the light exit end is parallel to the bonding surface 2300, so that the light exit end 400 can oppose the light entrance surface 354 of the core 35 in the slider 22. For securing the light-emitting device 40 in practice, for example, after a vapor deposition film of an AuSn alloy having a thickness on the order of 0-7 to 1 μm is formed on the surface of the electrode pad 47, the light-emitting device 40 is mounted thereon and then heated to a temperature on the order of 200 to 300° C. by a hot plate or the like under a hot air blower.

The electrode pad 48 and the p-electrode 40*j* of the light-emitting device 40 are electrically connected to each other by a bonding wire. The electrode connected to the electrode pad 47 may be the p-electrode 40*j* instead of the n-electrode 40*a*. In this case, the n-electrode 40*a* is connected to the electrode pad 48 by a bonding wire. Processing the support substrate side of the light-emitting device 40 into a stepped form can yield an electric connection structure using no bonding wire.

When the above-mentioned soldering with the AuSn alloy is effected here, the light source unit is heated to a high temperature of about 300° C., for example. The light source unit 23 is manufactured separately from the slider 22 in the present invention, whereby the magnetic head part within the slider is kept from being adversely affected by the high temperature.

The back face 2201 of the slider 22 and the bonding surface 2300 of the light source nit 23 are bonded to each other by an adhesive layer 44 such as UV-curable adhesive (see FIG. 4), for example, while the light exit end 400 of the light-emitting device 40 is arranged such as to oppose the light entrance surface 354 of the core 35.

The structures of the light-emitting device 40 and electrode pads are not limited to those in the above-mentioned embodiment as a matter of course. For example, the light-emitting device 40 may have other structures using other semiconductor materials such as those based on GaAlAs. Other brazing materials may be used for soldering the light-emitting device 40 to the electrodes. The light-emitting device 40 may be formed by epitaxially growing a semiconductor material directly on a unit substrate.

Manufacturing Method

With reference to FIGS. 18A to 26B, a method of manufacturing the thin-film magnetic head in accordance with the first embodiment will now be explained. Not only sputtering but chemical vapor deposition (CVD) or the like may also be used for forming each layer. As for etching, not only dry etching such as IBE (ion beam etching), RIE (reactive ion etching), and sputtering with noble gases, but chemical etching (wet etching) may also be used.

Figure 18A:
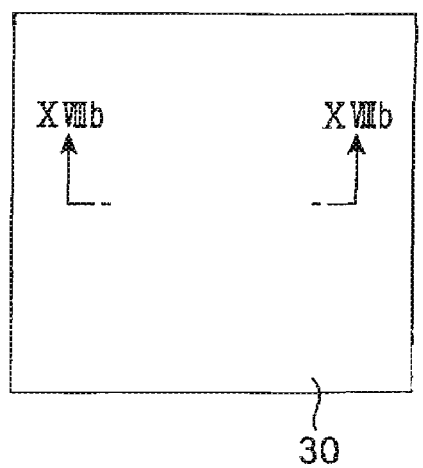
FIG. 18A is a plan view of a thermally assisted magnetic head intermediate.
Figure 18B:
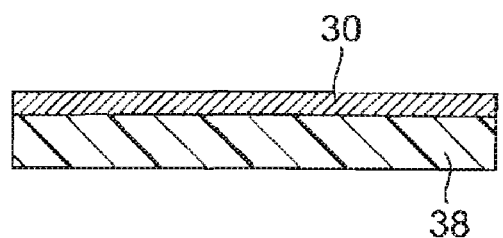
FIG. 18B is a sectional view of the thermally assisted magnetic bead intermediate taken along the line XVIIIB-XVIIIB of FIG. 19A.

FIG. 18A is a plan view of a thermally assisted magnetic head intermediate, whereas FIG. 18B is a sectional view of the thermally assisted magnetic head intermediate taken along the line XVIIIB-XVIIIB of FIG. 18A.

First, a core layer 30 is formed on an insulating layer 38 acting as a substrate to become a cladding. A near-field light generating part is formed on the light exit surface of the core layer 30. The method of forming the near-field light generating part will be explained later.

Figure 18C:
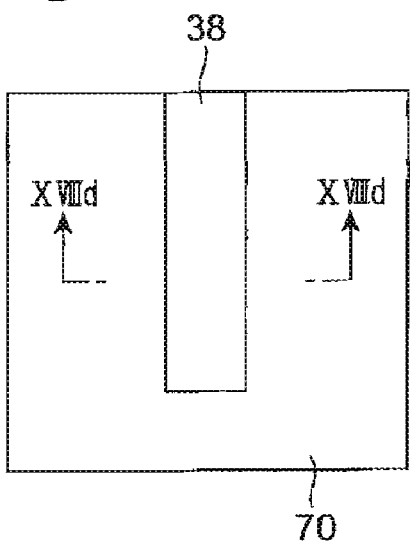
FIG. 18C is a plan view of a thermally assisted magnetic bead intermediate.
Figure 18D:
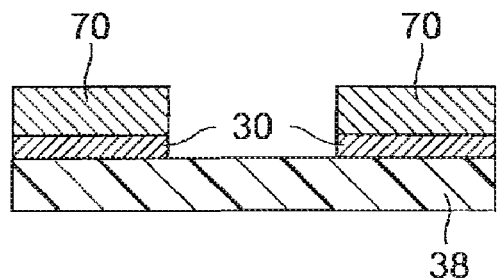
FIG. 18D is a sectional view of the thermally assisted magnetic head intermediate taken along the line XVIIID-XVIIID of FIG. 18C.

FIG. 18C is a plan view of a thermally assisted magnetic head intermediate, whereas FIG. 18D is a sectional view of the thermally assisted magnetic head intermediate taken along the line XVIIID-XVIIID of FIG. 18C.

Next, a photoresist 70 as a mask is applied onto the core layer 30 for a leading end part and exposed to light such that an area to be formed with a core layer 35 for a base end part (see FIG. 19D) is open. Then, the photoresist 70 is developed, so as to form a resist pattern. After forming the resist pattern, the area (core layer 30) within the opening of the photoresist 70 is etched until the surface of the insulating layer 38 is exposed. Thereafter, the photoresist 70 is peeled off with a solvent.

Figure 19A:
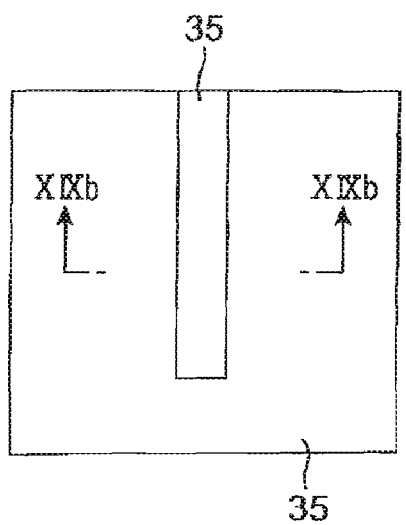
FIG. 19A is a plan view of a thermally assisted magnetic head intermediate.
Figure 19B:
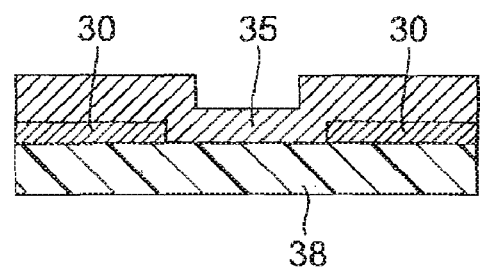
FIG. 19B is a sectional view of the thermally assisted magnetic head intermediate taken along the XIXB-XIXB line of FIG. 19A.

FIG. 19A is a plan view of a thermally assisted magnetic head intermediate, whereas FIG. 19B is a sectional view of the thermally assisted magnetic head intermediate taken along the line XIXB-XIXB of FIG. 19A.

After peeling off the photoresist 70, the core layer 35 for the base end part is formed on the substrate. The material for the core layer 35 is basically the same as that for the core layer 30. The core layer 30 may be formed by a plurality of layers. In this case, if the core layer 35 can transmit light, the core layer 30 may employ a structure identical or similar thereto and be made of a light-transmitting material. The core layer 35 is deposited not only on the exposed surface of the insulating layer (cladding) 38, but also on its surrounding core layer 30.

Figure 19C:
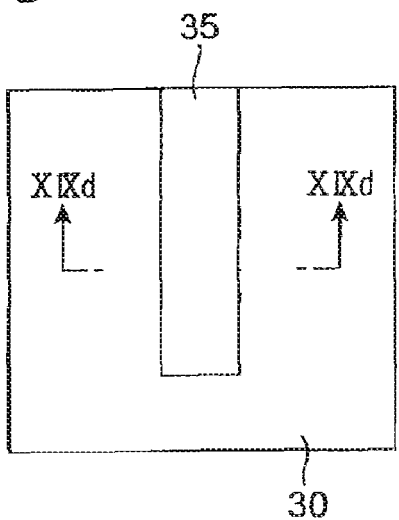
FIG. 19C is a plan view of a thermally assisted magnetic head intermediate.
Figure 19D:
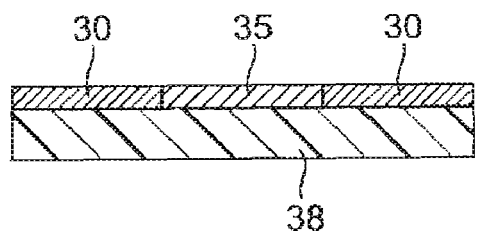
FIG. 19D is a sectional view of the thermally assisted magnetic head intermediate taken along the line XIXD-XIXD of FIG. 19C.

FIG. 19C is a plan view of a thermally assisted magnetic head intermediate, whereas FIG. 19D is a sectional view of the thermally assisted magnetic head intermediate taken along the line XIXD-XIXD of FIG. 19C.

After depositing the core layer 35, the substrate surface is chemically mechanically polished until the core layer 30 is exposed, so that the polished surfaces of the core layers 35, 30 are included within the same plane. In other words, the core layers 35, 30 have the same height from the insulating layer 38, so that the exposed surface is made flat.

Figure 20A:
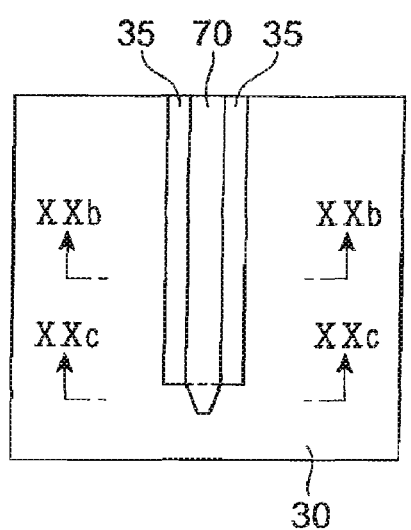
FIG. 20A is a plan view of a thermally assisted magnetic head intermediate.
Figure 20B:
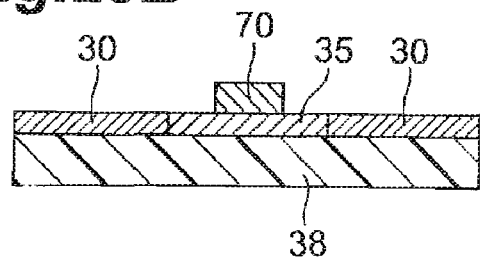
FIG. 20B is a sectional view of the thermally assisted magnetic head intermediate taken along the line XXB-XXB of FIG. 20A.
Figure 20C:
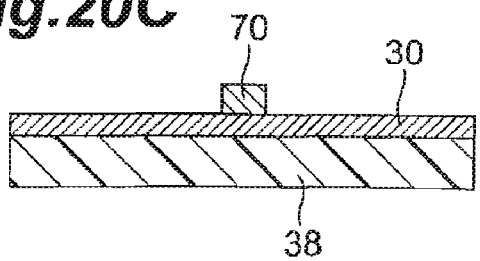
FIG. 20C is a sectional view of the thermally assisted magnetic head intermediate taken along the line XXC-XXC of FIG. 20A.

FIG. 20A is a plan view of a thermally assisted magnetic head intermediate, FIG. 20B is a sectional view of the thermally assisted magnetic head intermediate taken along the line XXB-XXB of FIG. 20A, and FIG. 20C is a sectional view of the thermally assisted magnetic head intermediate taken along the line XXC-XXC of FIG. 20A.

After performing the chemical mechanical polishing step mentioned above, the core layers 30, 35 are processed by photolithography. Namely, the photoresist 70 is formed on the flattened exposed surface such that the center part of the core layer 30 on the cross section XXC-XXC remains, while the center part of the core layer 35 on the cross section XXB-XXB remains by a width identical to the maximum width of the core layer 30. Subsequently using the photoresist 70 as a mask, the core layers 30, 35 are etched so as to leave their center parts. Namely, the photoresist 70 is applied such that the width of the core layer 35 perpendicular to the longitudinal direction thereof is narrowed, while the core layer 30 continues with one longitudinal end of the core layer 35 and becomes narrower as distanced farther from the core layer 35, and then is exposed to light and developed.

Figure 20D:
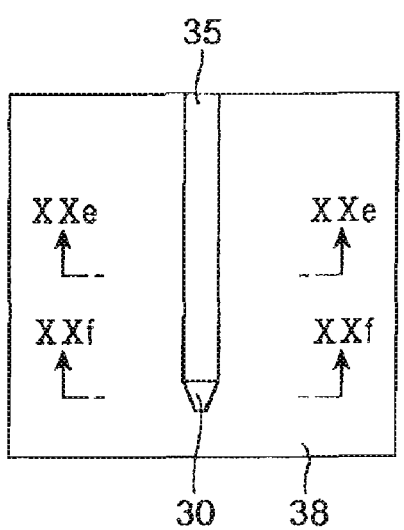
FIG. 20D is a plan view of a thermally assisted magnetic head intermediate.
Figure 20E:
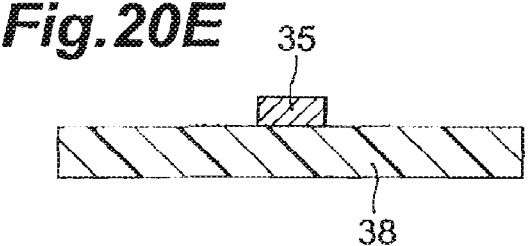
FIG. 20E is a sectional view of the thermally assisted magnetic head intermediate taken along the line XXE-XXE of FIG. 20D.
Figure 20F:
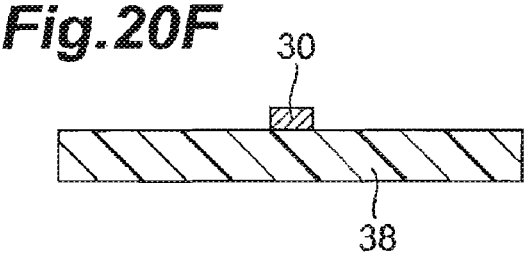
FIG. 20F is a sectional view of the thermally assisted magnetic head intermediate taken along the line XXF-XXF of FIG. 20D.

FIG. 20D is a plan view of a thermally assisted magnetic head intermediate, FIG. 20E is a sectional view of the thermally assisted magnetic head intermediate taken along the line XXE-XXE of FIG. 20D, and FIG. 20F is a sectional view of the thermally assisted magnetic head intermediate taken along the line XXF-XXF of FIG. 20D.

Using the above-mentioned photoresist 70 as a mask, the cores 30, 35 are etched. As a result of this etching, the core layer 30 continues with the leading end side of the core layer 35 and tapers down the width toward the leading end. After the etching is completed, the photoresist 70 is removed.

Figure 21A:
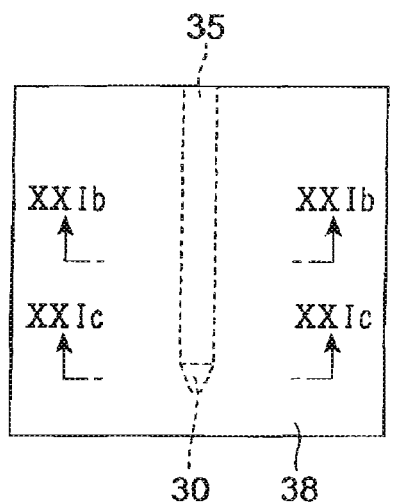
FIG. 21A is a plan view of a thermally assisted magnetic head intermediate.
Figure 21B:
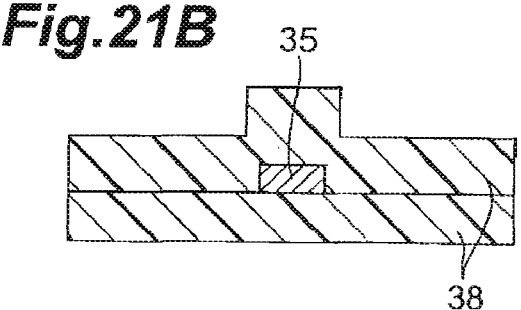
FIG. 21B is a sectional view of the thermally assisted magnetic head intermediate ten along the line XXIB-XXIB of FIG. 21A.
Figure 21C:
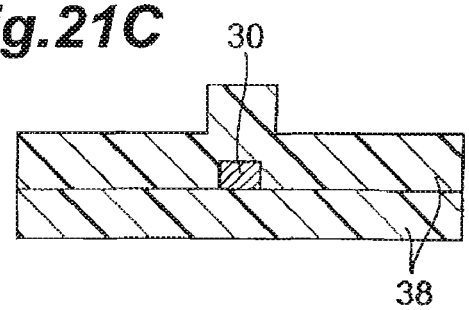
FIG. 21C is a sectional view of the thermally assisted magnetic head intermediate taken along the line XXIC-XXIC of FIG. 21A.

FIG. 21A is a plan view of a thermally assisted magnetic head intermediate, FIG. 21B is a sectional view of the thermally assisted magnetic head intermediate taken along the line XXIB-XXIB of FIG. 21A, and FIG. 21C is a sectional view of the thermally assisted magnetic head intermediate taken along the line XXIC-XXIC of FIG. 21A.

On the exposed surfaces of the core layers 30, 35 and insulating layer 38 processed as in the foregoing, an insulating layer 38 to become an upper cladding layer is deposited. Since the upper cladding layer is made of the same material as that of an insulating layer 38 constituting the lower cladding layer and will be integrated with the lower cladding layer after being formed, these layers will be referred to with the same numeral.

Figure 21D:
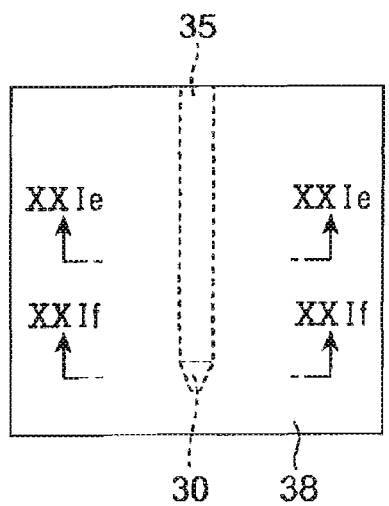
FIG. 21D is a plan view of a thermally assisted magnetic head intermediate.
Figure 21E:
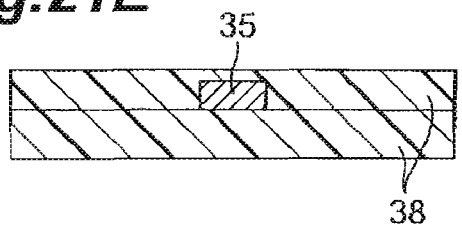
FIG. 21E is a sectional view of the thermally assisted magnetic head intermediate taken along the line XXIE-XXIE of FIG. 21D.
Figure 21F:
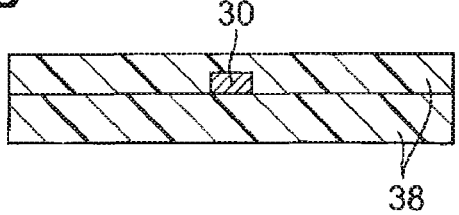
FIG. 21F is a sectional view of the thermally assisted magnetic head intermediate taken along the line XXIF-XXIF of FIG. 21D.

FIG. 21D is a plan view of a thermally assisted magnetic head intermediate, FIG. 21E is a sectional view of the thermally assisted magnetic head intermediate taken along the line XXIE-XXIE of FIG. 21D, and FIG. 21F is a sectional view of the thermally assisted magnetic head intermediate taken along the line XXIF-XXIF of FIG. 21D.

Next, the insulating layer 38 to become the upper cladding layer is chemically mechanically polished until the surface becomes flat. The insulating layer 38 is interposed between the exposed surface after the polishing and the core layers 30, 35, while these surfaces are covered with the insulating layer 38.

Figure 22A:
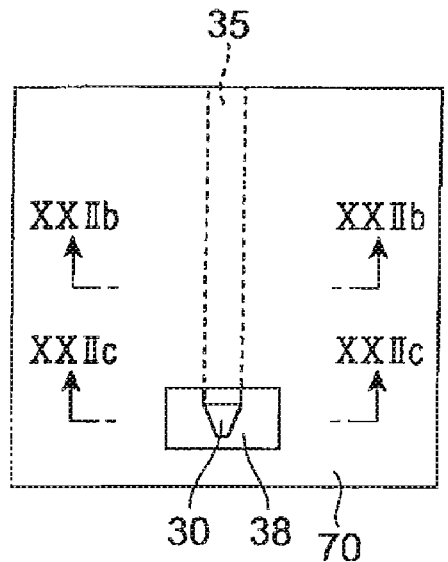
FIG. 22A is a plan view of a thermally assisted magnetic head intermediate.
Figure 22B:
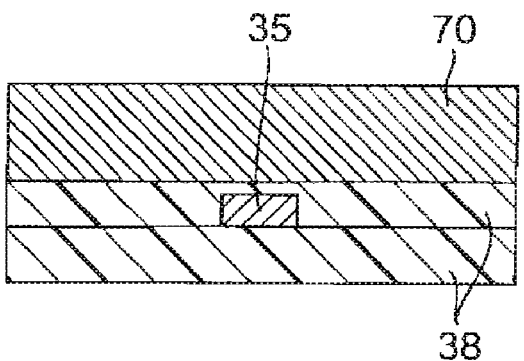
FIG. 22B is a sectional view of the thermally assisted magnetic head intermediate taken along the line XXIIB-XXIIB of FIG. 22A.
Figure 22C:
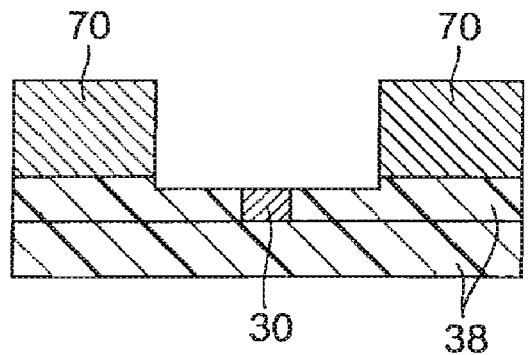
FIG. 22C is a sectional view of the thermally assisted magnetic head intermediate taken along the line XXIIC-XXIIC of FIG. 22A.

FIG. 22A is a plan view of a thermally assisted magnetic head intermediate, FIG. 22B is a sectional view of the thermally assisted magnetic head intermediate taken along the line XXIIB-XXIIB of FIG. 22A, and FIG. 22C is a sectional view of the thermally assisted magnetic head intermediate taken along the line XXIIC-XXIIC of FIG. 22A.

After the chemical mechanical polishing step mentioned above, the photoresist 70 is applied onto the exposed surface of the insulating layer 38 to become the upper cladding layer, and then is exposed to light and developed such that only an area directly above the core layer 30 and an area on the leading end side of a part of the core layer 35 are open, thereby forming a resist pattern only opening at the leading end area. Using this resist pattern as a mask, the insulating layer 38 is etched (ion-milled) until the surface of the core layer 38 is exposed, and the surface layer of the insulating layer 38 is removed.

Figure 22D:
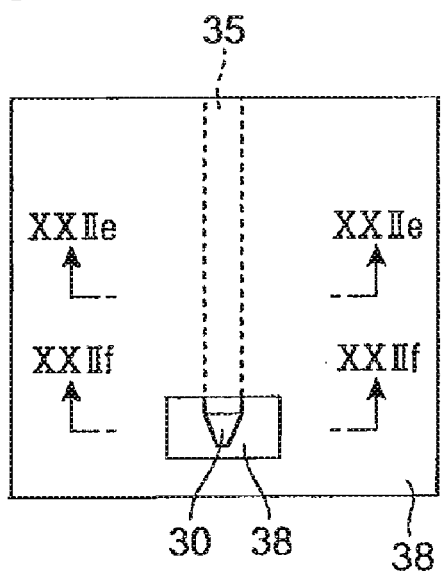
FIG. 22D is a plan view of a thermally assisted magnetic head intermediate.
Figure 22E:
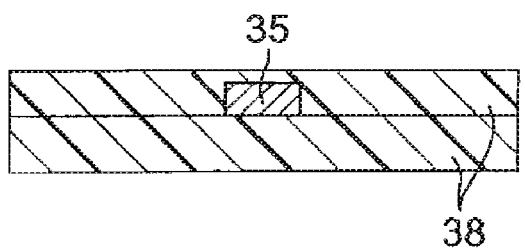
FIG. 22E is a sectional view of the thermally assisted magnetic head intermediate taken along the line XXIIE-XXIIE of FIG. 22D.
Figure 22F:
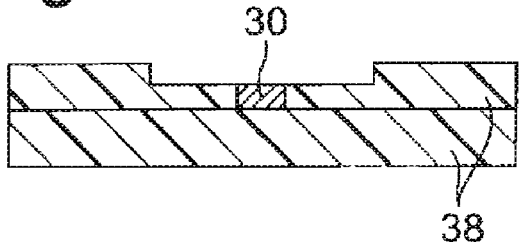
FIG. 22F is a sectional view of the thermally assisted magnetic head intermediate taken along the line XXIIF-XXIIF of FIG. 22D.

FIG. 22D is a plan view of a thermally assisted magnetic head intermediate, FIG. 22E is a sectional view of the thermally assisted magnetic head intermediate taken along the line XXIIE-XXIIE of FIG. 22D, and FIG. 22F is a sectional view of the thermally assisted magnetic head intermediate taken along the line XXIIF-XXIIF of FIG. 22D.

After the etching step mentioned above, the resist pattern made of the photoresist 70 is removed with a solvent. Removing the photoresist 70 exposes the whole surface of the insulating layer 38.

Figure 23A:
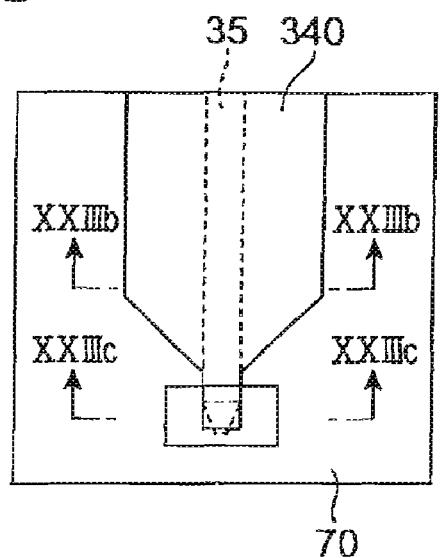
FIG. 23A is a plan view of a thermally assisted magnetic head intermediate.
Figure 23B:
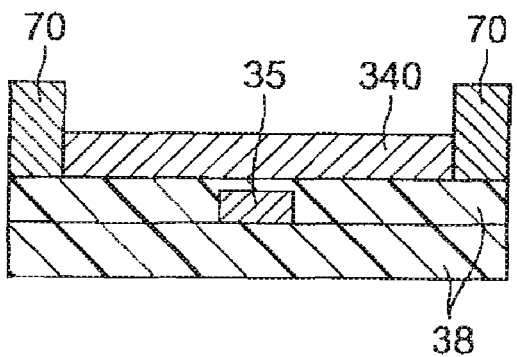
FIG. 23B is a sectional view of the thermally assisted magnetic head intermediate taken along the line XXIIIB-XXIIIB of FIG. 23A.
Figure 23C:
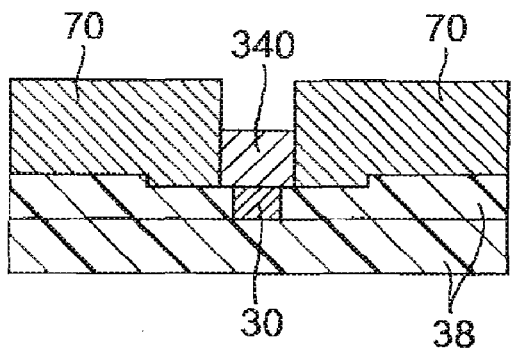
FIG. 23C is a sectional view of the thermally assisted magnetic head intermediate taken along the line XXIIIC-XXIIIC of FIG. 23A.

FIG. 23A is a plan view of a thermally assisted magnetic head intermediate, FIG. 23B is a sectional view of the thermally assisted magnetic head intermediate taken along the line XXIIIB-XXIIIB of FIG. 23A, and FIG. 23C is a sectional view of the thermally assisted magnetic head intermediate taken along the line XXIIIC-XXIIIC of FIG. 23A.

The photoresist 70 is applied onto the insulating layer 38 having the whole surface exposed, and predetermined exposure and developing operations are performed so as to form a resist pattern. This resist pattern has a leading-end side opening area OP1 formed by opening an area directly above the core layer 30 and a partial area on the leading end side of the core layer 35, and a base-end side opening area OP2 continuing with the opening area OP1 and extending in a direction from the core layer 30 to the core layer 35. Using this resist pattern as a mask, a magnetic material is deposited on the substrate, whereby a main magnetic pole 340 extending along the core layer 35 is formed. Plating may be used for depositing the magnetic material, while a seed layer may be formed as a foundation for the magnetic material if necessary.

Figure 23D:
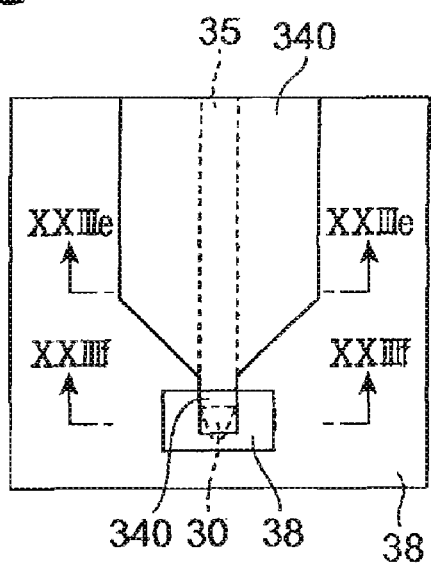
FIG. 23D is a plan view of a thermally assisted magnetic head intermediate.
Figure 23E:
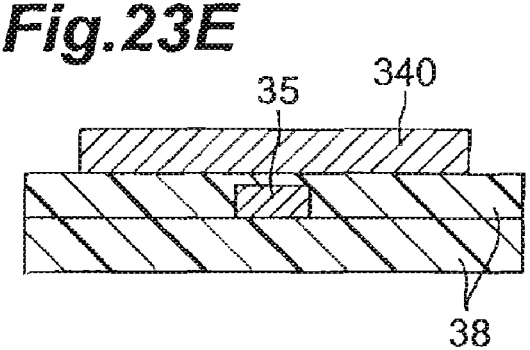
FIG. 23E is a sectional view of the thermally assisted magnetic head intermediate taken along the line XXIIIE-XXIIIE of FIG. 23D.
Figure 23F:
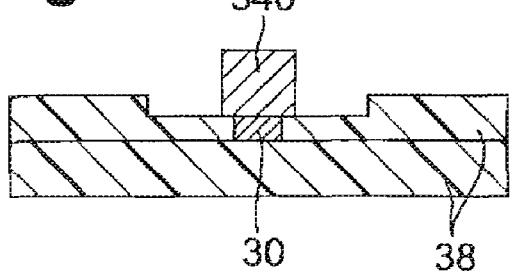
FIG. 23F is a sectional view of the thermally assisted magnetic head intermediate taken along the line XXIIIF-XXIIIF of FIG.

FIG. 23D is a plan view of a thermally assisted magnetic head intermediate, FIG. 23E is a sectional view of the thermally assisted magnetic head intermediate taken along the line XXIIIE-XXIIIE of FIG. 23D, and FIG. 23F is a sectional view of the thermally assisted magnetic head intermediate taken along the line XXIIIF-XXIIIF of FIG. 23D.

After depositing the magnetic material on the whole surface of the substrate while using the above-mentioned resist pattern as a mask, the photoresist 70 is dissolved with a solvent, so as to perform a step of peeling the photoresist 70 such as liftoff, thereby forming the main magnetic pole 340 by leaving the magnetic material only within the above-mentioned openings. The main magnetic pole 340 is set such as to increase its width gradually from the core layer 30 to the core layer 35 and become wider than the core layer 35 on the base end side.

Figure 24A:
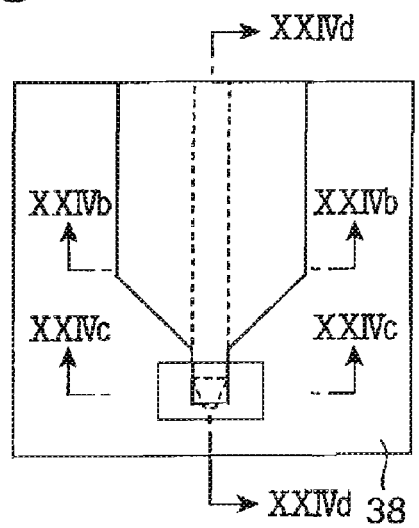
FIG. 24A is a plan view of a thermally assisted magnetic head intermediate.
Figure 24B:
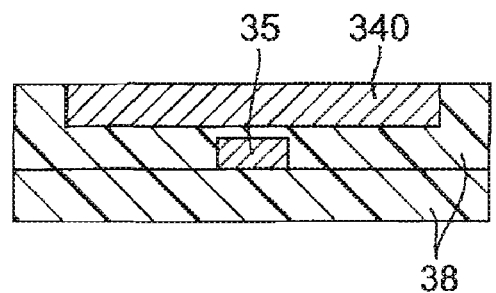
FIG. 24B is a sectional view of the thermally assisted magnetic head intermediate taken along the line XXIVB-XXIVB of FIG. 24A.
Figure 24C:
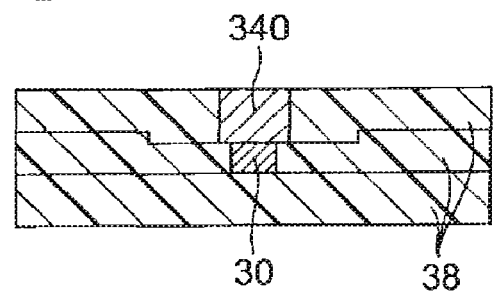
FIG. 24C is a sectional view of the thermally assisted magnetic head intermediate taken along the line XXIVC-XXIVC of FIG. 24A.
Figure 24D:
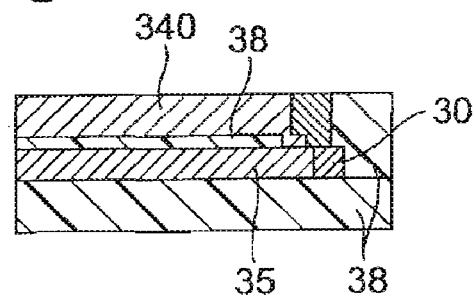
FIG. 24D is a sectional view of the thermally assisted magnetic head intermediate taken along the line XXIVD-XXIVD of FIG. 24A.

FIG. 24A is a plan view of a thermally assisted magnetic head intermediate, FIG. 24B is a sectional view of the thermally assisted magnetic head intermediate taken along the line XXIVB-XXIVB of FIG. 24A, FIG. 24C is a sectional view of the thermally assisted magnetic head intermediate taken along the line XXIVC-XXIVC of FIG. 24A, and FIG. 24D is a sectional view of the thermally assisted magnetic head intermediate taken along the line XXIVC-XXIVC of FIG. 24A.

After forming the main magnetic pole 340, an insulating layer 38 functioning as a protective film and a cladding layer for the core layer 30 on the leading end side is deposited on the whole surface of the substrate, and then the surface of the insulating layer 38 is chemically mechanically polished until the surface of the main magnetic pole 340 is exposed and the exposed surface becomes flat. The insulating layer 38 is formed from $Al_2O_3$ or the like. The leading end side of the main magnetic pole 340 is polished until the near-field light generating part 36 formed at the leading end part of the core layer 30 attains a predetermined thickness. The above-mentioned core layer 35 may have a double structure made of inner and outer core materials or consist of a single material, for example.

A method of making the core layer 30 formed with a metal layer 36a to become the above-mentioned near-field light generating part will now be explained.

Figure 25A:
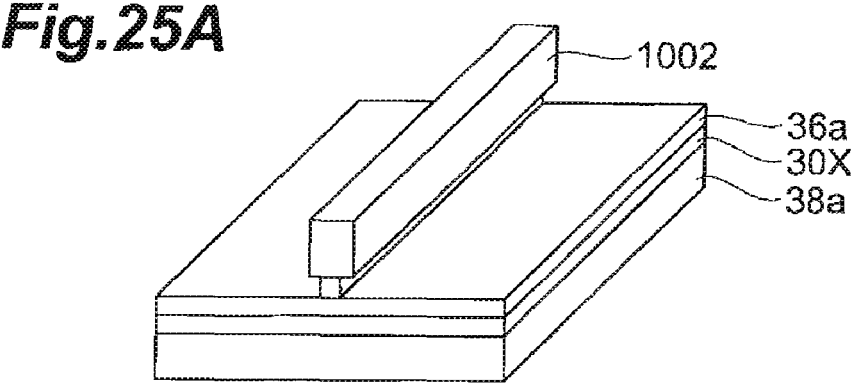
FIG. 25A is a perspective view for explaining an embodiment of a method of forming an optical waveguide 35 and a near-field light generating part 36.

First, as shown in FIG. 25A, a dielectric multilayer film 30X which is to become a part of the core layer 30 and made of $Ta_2O_5$ or the like having a refractive index higher than that of the insulating layer 38a is formed on the insulating layer 38 made of $Al_2O_3$ or the like, a met layer 36a made of Au or the like is formed thereon, and a resist pattern 1002 for liftoff having a narrowed bottom part is formed thereon.

Figure 25B:
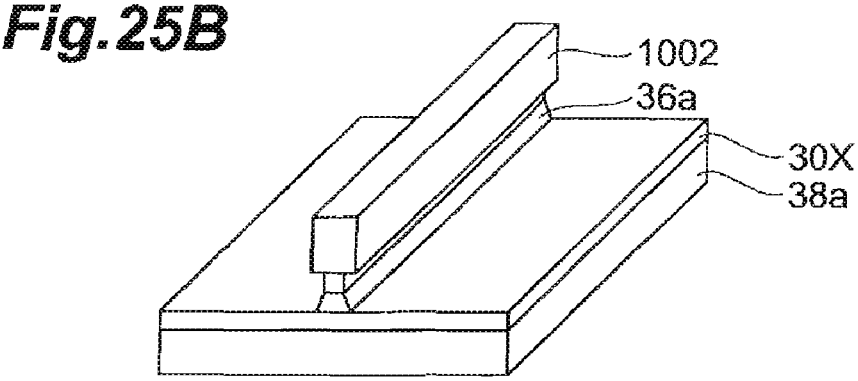
FIG. 25B is a perspective view for explain the embodiment of the method of forming the optical waveguide 35 and near-field light generating part 36.

Subsequently, as shown in FIG. 25B, ion milling or the like is used for removing unnecessary parts of the metal layer 36a except for the area directly under the resist pattern 1002, so as to form a pattern of the metal layer 36a having a trapezoidal form with a wider bottom part laminated on the dielectric multilayer film 30X.

Figure 25C:
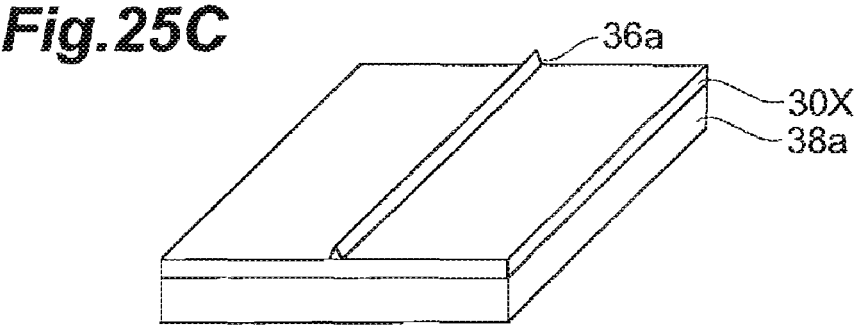
FIG. 25C is a perspective view for explaining the embodiment of the method of forming the optical waveguide 35 and near-field light generating part 36.

Thereafter, as shown in FIG. 25C, the resist pattern 1002 is removed, and then the slopes of the trapezoidal metal layer 36a are partly removed from their outer sides by ion milling or the like, so as to form the metal layer 36a having a triangular cross section.

Figure 25D:
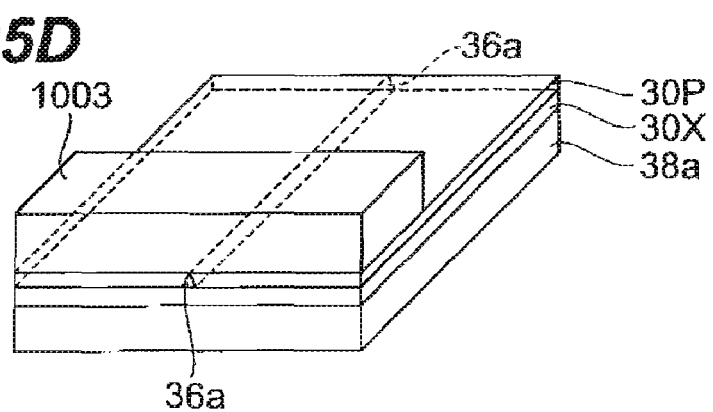
FIG. 25D is a perspective view for explaining the embodiment of the method of forming the optical waveguide 35 and near-field light generating part 36.
Figure 26A:
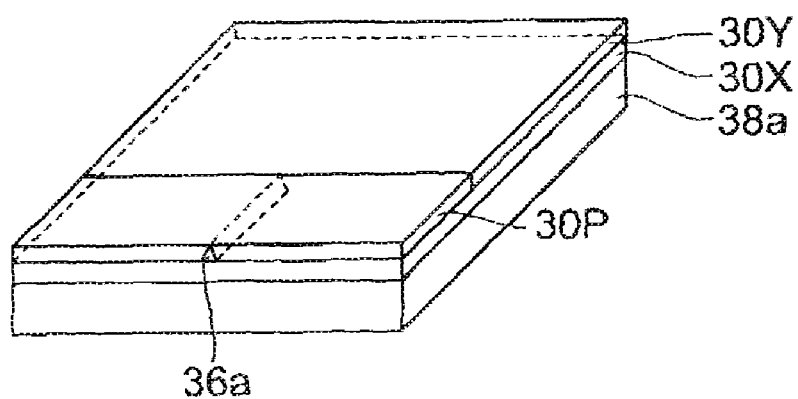
FIG. 26A is a perspective view for explaining the embodiment of the method of forming the optical waveguide 35 and near-field light generating part 36.
Figure 26B:
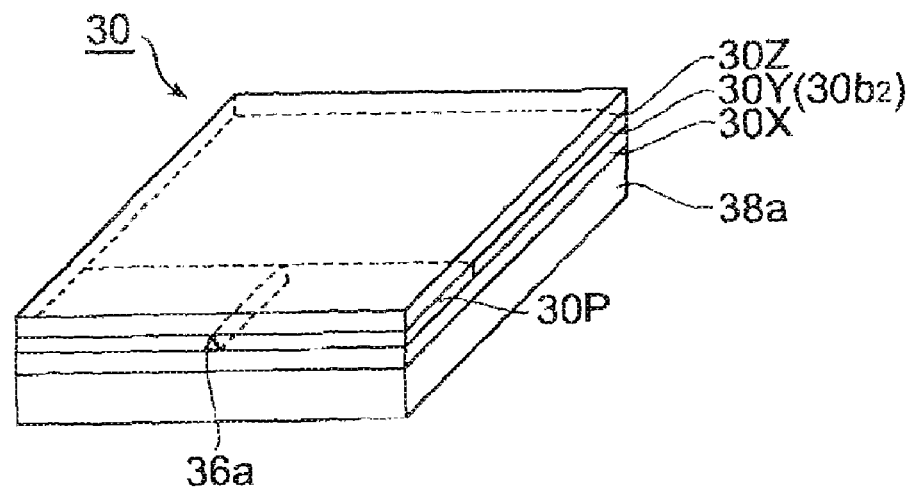
FIG. 26B is a perspective view for explaining the embodiment of the method of forming the optical waveguide 35 and near-field light generating part 36.

Subsequently, as shown in FIG. 25D, a monolayer or multilayer dielectric film 30P made of the same material as that of the dielectric multilayer film 30X is formed on the dielectric multilayer film 30X so as to cover the metal layer 36a. On a side to be formed with a medium-opposing surface, a resist pattern 1003 for forming an end face of the metal layer 36a is laminated. On a side opposite from the side to be formed with the medium-opposing surface, as shown in FIG. 26A, the metal layer 36a and dielectric film 30P are removed by ion milling or the like, and then a monolayer or multilayer dielectric film 30Y made of the same material as that of the dielectric multilayer film 30P is formed in thus exposed part.

Further, as shown in FIG. 261B, a monolayer or multilayer dielectric film 30Z having an effective refractive index different from that of the dielectric film 30Y is laminated on the dielectric films 30P and 30Y, whereby the core layer 30 in which the metal layer 36a to become the near-field light generating part 36 is buried is completed. After forming the cladding and main magnetic pole, the surface on the front side of FIG. 26B, which becomes the ABS surface, is lapped until the metal layer 36a attains a predetermined thickness, whereby the near-field light generating part 36 having a triangular form is formed on the light exit surface (ABS surface).

The foregoing process can form the core layer 30 equipped with the near-field light generating part 36. Then, the electromagnetic coil device 34 such as the one shown in FIG. 4 is formed by a known method. Thereafter, the insulating layer 38 made of alumina or the like is formed, the electrode pads 371 for connection and the like are formed, and then the air bearing surface and the rear face thereof are lapped, whereby the slider 22 is completed. After that, the electromagnetic coil device 34 and MR device 33 are tested in each slider 22, and conforming products are selected. Subsequently, the light source unit 23 shown in FIG. 4 is assembled, and conforming products are selected.

Figure 27A:
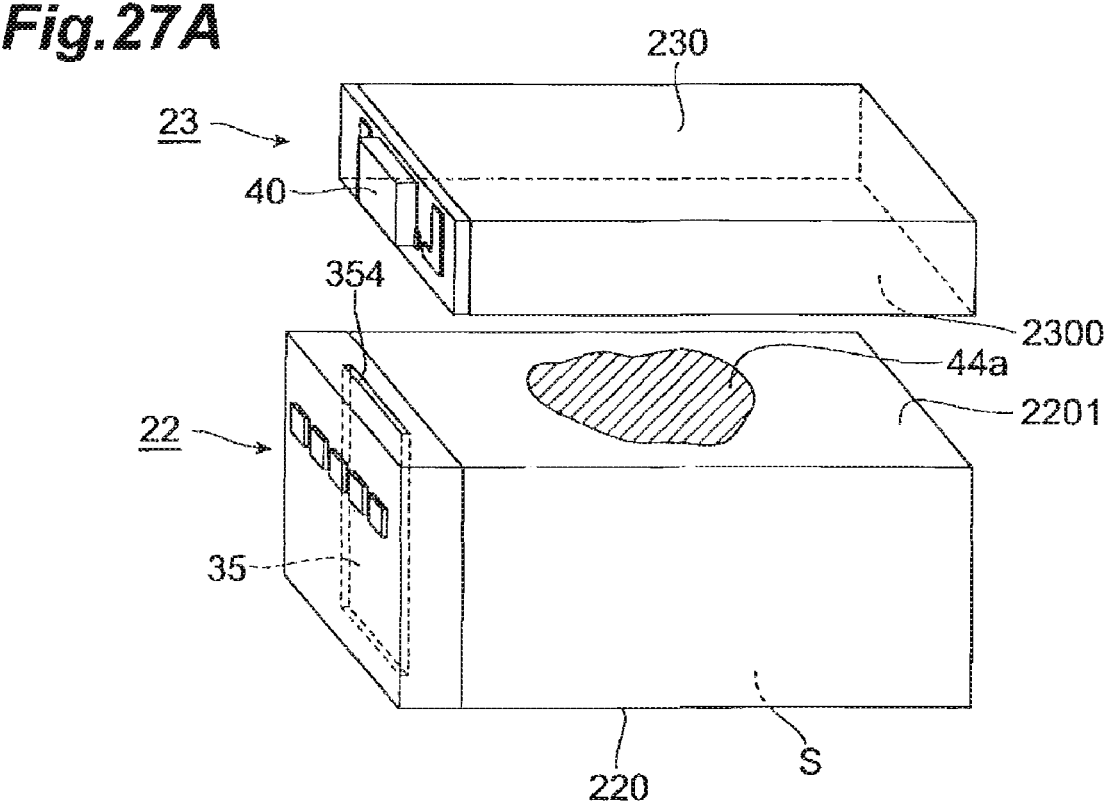
FIG. 27A is a perspective view showing a method of manufacturing a thermally assisted magnetic head.

Next, as shown in FIG. 27A, a UV-curable adhesive 44a is applied to one or both of the bonding surface 2300 of the light source unit 23 taken as a conforming product and the rear face 2201 of the slider 22 taken as a conforming product. Examples of the UV-curable adhesive include UV-curable epoxy resins and UV-curable acrylic resins.

Figure 27B:
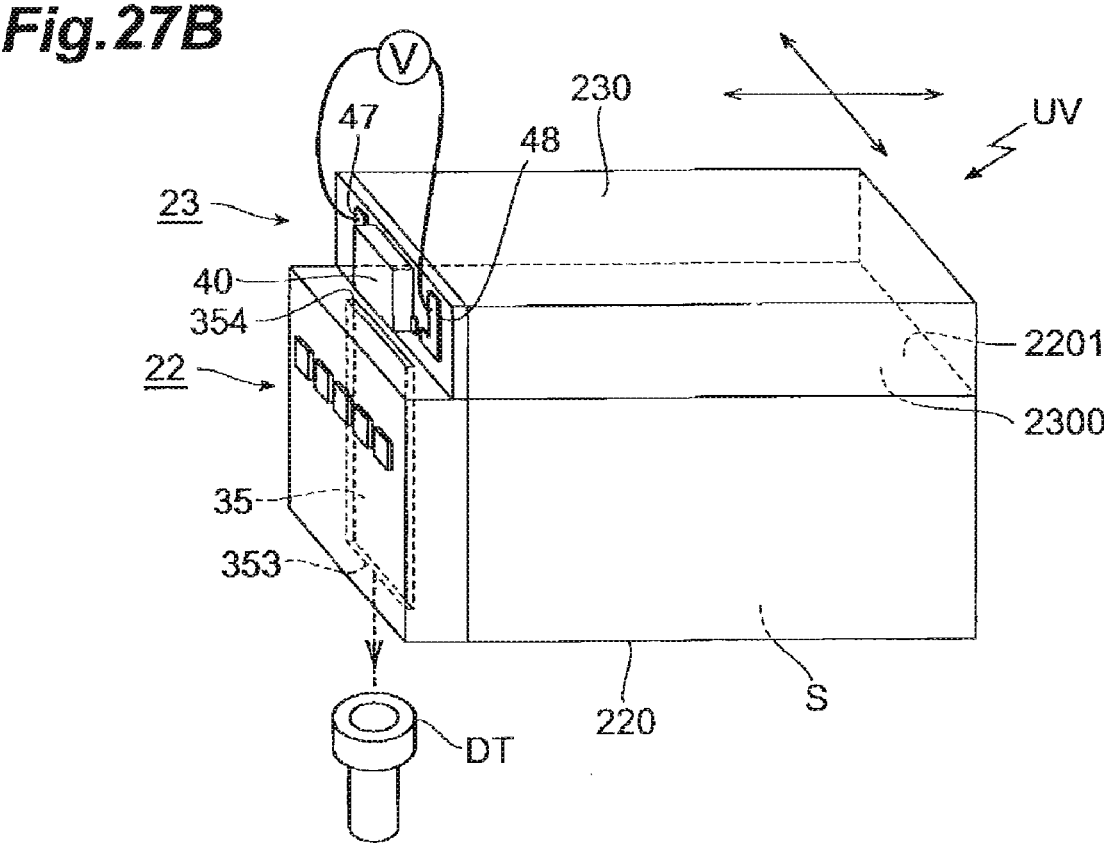
FIG. 27B is a perspective view showing the method of manufacturing a thermally assisted magnetic head.

Then, as shown in FIG. 27B, the bonding surface 2300 of the light source unit 23 and the back face 2201 of the slider 22 are overlaid on each other. Thereafter, while the light-emitting device 40 of edge-emitting type is caused to emit light by applying a voltage between the electrode pads 47, 48, the light source unit 23 and the slider 22 are relatively moved in the arrowed directions of FIG. 27B, so as to find out a position at which a photodetector DT attains the highest output. At this position, the UV-curable adhesive 44a is cured by irradiation with UV rays from the outside, whereby the light source unit 23 and slider 22 can be bonded together in the state where the optical axes of the laser diode and core layer 35 align with each other.

Operation

Operations of the thermally assisted magnetic head 21 in accordance with this embodiment will now be explained.

At the time of a writing or reading action, the thermally assisted magnetic head 21 hydrodynamically floats above the rotating magnetic disk (medium) 10 by a predetermined amount of levitation. At this time, the ends of the MR device 33 and electromagnetic coil device 34 on the medium-opposing surface S side oppose the magnetic disk 10 through a minute spacing, whereby reading by sensing a data signal magnetic field and writing by exerting a data signal magnetic field are performed.

At the time of writing data signals, laser light propagating through the core 35 from the light source unit 23 reaches the near-field light generating part 36, whereby the near-field light generating part 36 generates near-field light. This near-field light enables thermally assisted magnetic recording.

Employing a thermally assisted magnetic recording scheme enables writing on magnetic disks having a high coercivity with a thin-film magnetic head for perpendicular magnetic recording, so as to attain very fine recording bits, thereby achieving a recording density in the class of 1 Tbits/$in^2$, for example.

In this embodiment, the light emitted from the light exit surface 353 of the core 35 is made incident on the core 30 from the light entrance surface 302, and then is emitted from the light exit surface 301 provided on the medium-opposing surface S side. At this time, the core 30 acts such that the center of the intensity distribution of the light emitted from the light exit surface 301 of the core 30 is located closer to the leading end 3401 of the main magnetic pole 340 than is the center of the intensity distribution of the light emitted from the light exit surface 353 of the core 35 when seen from the medium-opposing surface S side (see FIG. 6). This can shorten the time elapsing after heating the magnetic recording medium until a writing magnetic field is applied to the heated recording area. As a result, it becomes unnecessary to keep the high-temperature state in the recording area of the magnetic recording medium, whereby the recording frequency at the time of magnetic recording can be raised.

In particular, the modified example of the embodiment allows the center of the intensity distribution of the tight emitted from the light exit surface 301 of the core 30 and the center of the leading end 3401 of the main magnetic pole 340 to substantially coincide with each other when seen from the medium-opposing surface S side, whereby heating the magnetic recording medium and applying the writing magnetic field to the heated recording area can be performed at substantially the same time. As a result, the recording frequency at the time of magnetic recording can further be raised.

Figure 28:
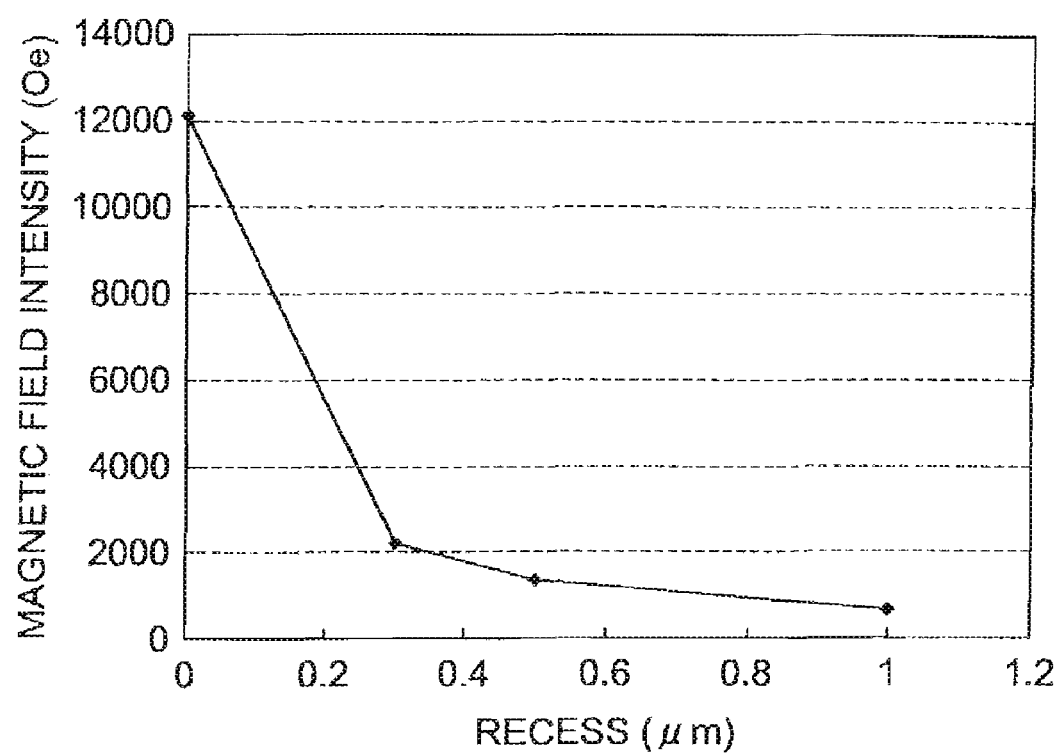
FIG. 28 is a graph showing results of a simulation of the relationship between the recording magnetic field intensity and the amount of recessing of a main magnetic pole 340.

In this embodiment, the leading end 3401 of the main magnetic pole 340 is placed deeper by the distance R340 than the medium-opposing surface S. This somewhat decreases the intensity of the magnetic field applied to the magnetic recording medium as compared with the case where the leading end 3401 of the main magnetic pole 340 is provided within the medium-opposing surface S. FIG. 28 shows results of a simulation of the relationship between the recording magnetic field intensity and the distance R340 (amount of recessing) from the medium-opposing surface S to the leading end 3401 of the main magnetic pole 340. As shown in this graph, the recording magnetic field intensity is found to monotonously decrease as the amount of recessing increases.

However, when seen from the medium-opposing surface S, the center of the intensity distribution of the light emitted from the light exit surface 301 of the core 30 and the center of the leading end 3401 of the main magnetic pole 340 can be located closer to each other as the distance R340 is made greater. Therefore, appropriately choosing the magnitude of the R340 can yield a magnetic head with improved recording frequency performances while keeping the decrease in recording magnetic field intensity within a tolerable range. A preferred range of the distance R340 is 0.4 to 0.8 μm.

By using the light source unit 23, this embodiment can make laser flight propagating in a direction parallel to the layer surface of the core 35 incident on the light entrance surface (end face) 354 of the core 35 in the slider 22. Namely, laser light having an appropriate magnitude and direction can reliably be supplied in the thermally assisted magnetic head 21 having a structure in which the integration surface 202 and the medium-opposing surface S are perpendicular to each other. As a result, thermally assisted magnetic recording with a high efficiency in heating the recording layer of the magnetic disk can be realized.

Since the magnetic head part 32 and the laser diode 40 acting as a light source are separately fixed to the slider substrate 220 and the light source support substrate 230, respectively, this embodiment can manufacture the thermally assisted magnetic head 21, which is a conforming product, with a favorable yield by testing the electromagnetic coil device 34 fixed to the slider substrate 220 and the laser diode 40 fixed to the light source support substrate 230 independently from each other and then securing the slider 22, which is a conforming product, and the light source unit 23, which is a conforming product, to each other.

Also, since the magnetic head part 32 is provided at a side face of the slider substrate 220, the electromagnetic coil device 34, MR device 33, and the like of the magnetic head part 32 can easily be formed by using a conventional method of manufacturing a thin-film magnetic head.

Further, since the laser diode 40 is located remote from the medium-opposing surface S but near the slider 22, possibilities of the heat generated from the laser diode 40 adversely affecting the electromagnetic coil device 34, MR device 33, and the like, the laser diode 40 and the magnetic disk 10 coming into contact with each other, and so forth can be suppressed. Since optical fibers, lenses, mirrors, and the like are not indispensable, the propagation loss of light can be reduced. The overall structure of the magnetic recording apparatus can be made simple as well.

Since the heat insulating layer 230a is formed on the rear face of the light source support substrate 230, the heat generated from the laser diode 40 is further harder to be conducted to the slider 22 in this embodiment.

Though both of the slider substrate 220 and light source support substrate 230 are made of AlTiC in the above-mentioned embodiment, they may be formed from different materials. Even in the latter case, it will be preferred if $\lambda s \leq \lambda 1$, where $\lambda s$ is the coefficient of thermal conductivity of the slider substrate 220, and $\lambda 1$ is the coefficient of thermal conductivity of the light source support substrate 230. This makes it easy to dissipate the heat generated by the laser diode 40 to the outside through the lift source support substrate 230 while minimizing its propagation to the slider substrate 220.

While the slider 22 and light source unit 23 may have any sizes, the slider 22 may be a so-called femto slider having a width in the track width direction of 700 μm, a length (depth) of 850 μm, and a thickness of 230 μm. In this case, the light source unit 23 may have a width and a length which are substantially the same as those mentioned above. In practice, for example, a commonly employed laser diode has a typical size with a width of about 250 μm, a length (depth) of about 350 μm, and a thickness of about 65 μm, whereby the laser diode having this size can fully be placed at a side face of the light source support substrate 230 having the size mentioned above. The bottom face of the light source support substrate 230 may be provided with a groove, within which the laser diode 40 is placed.

The electromagnetic coil device 34 may be one for longitudinal magnetic recording as well. In this case, lower and upper magnetic pole layers are provided in place of the main magnetic pole layer 340 and auxiliary magnetic pole layer 344, and a writing gap layer held between the respective end parts of the lower and upper magnetic pole layers on the medium-opposing surface S side is further provided. Writing is effected by leakage magnetic fields from the position where the writing gap layer is placed.

Second Embodiment

The second embodiment of the thermally assisted magnetic head, head gimbal assembly, and hard disk drive in accordance with the present invention will now be explained with reference to FIGS. 29 to 33. FIGS. 29 to 33 correspond to FIGS. 4, 6, 8, 9, and 13 in the first embodiment, respectively. The second embodiment differs from the first embodiment in terms of modes of the main magnetic pole 340, cores 30 and 35, and near-field light generating part 36.

Figure 29:
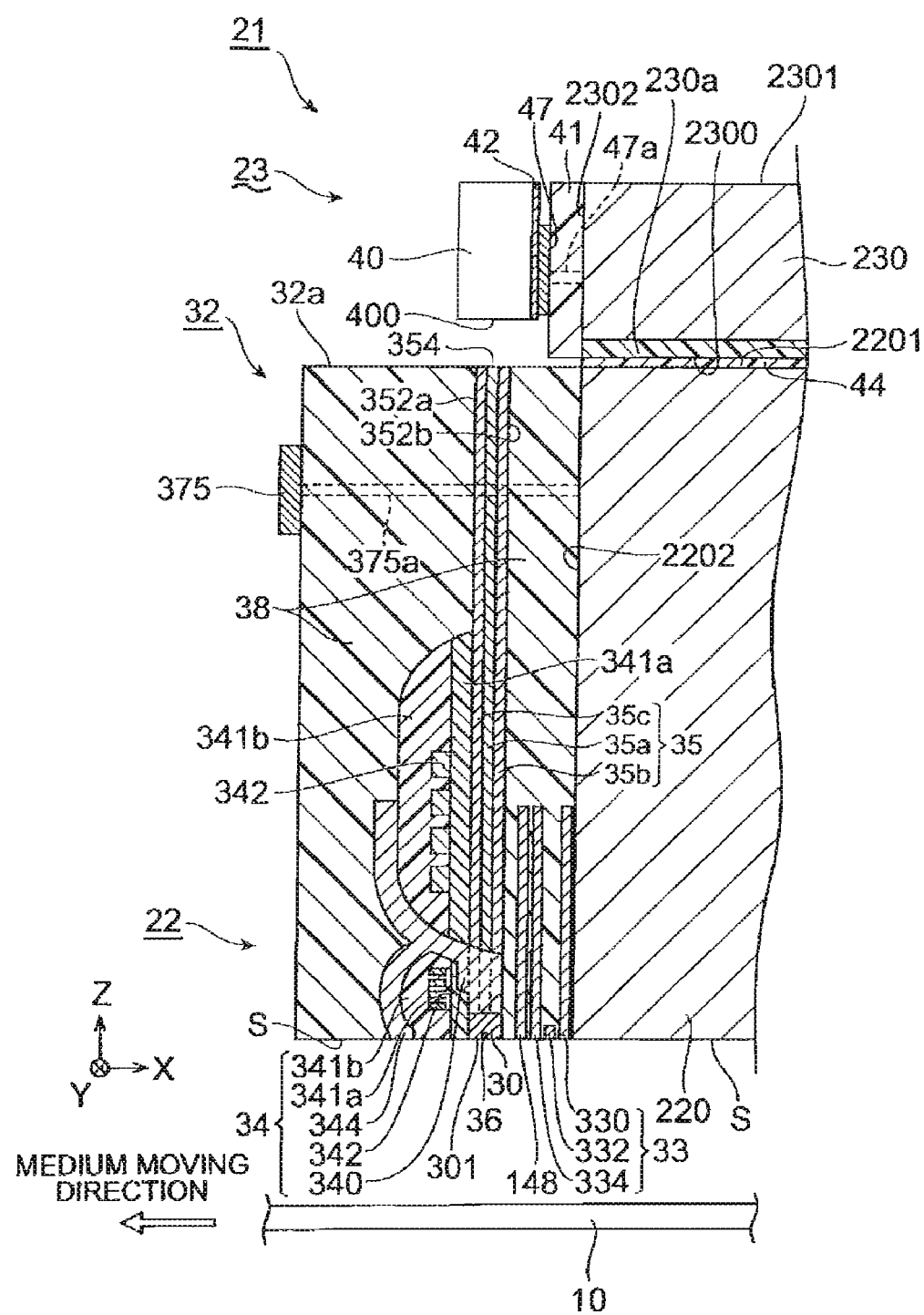
FIG. 29 is a sectional view of the thermally assisted magnetic head 21 in accordance with a second embodiment.
Figure 30:
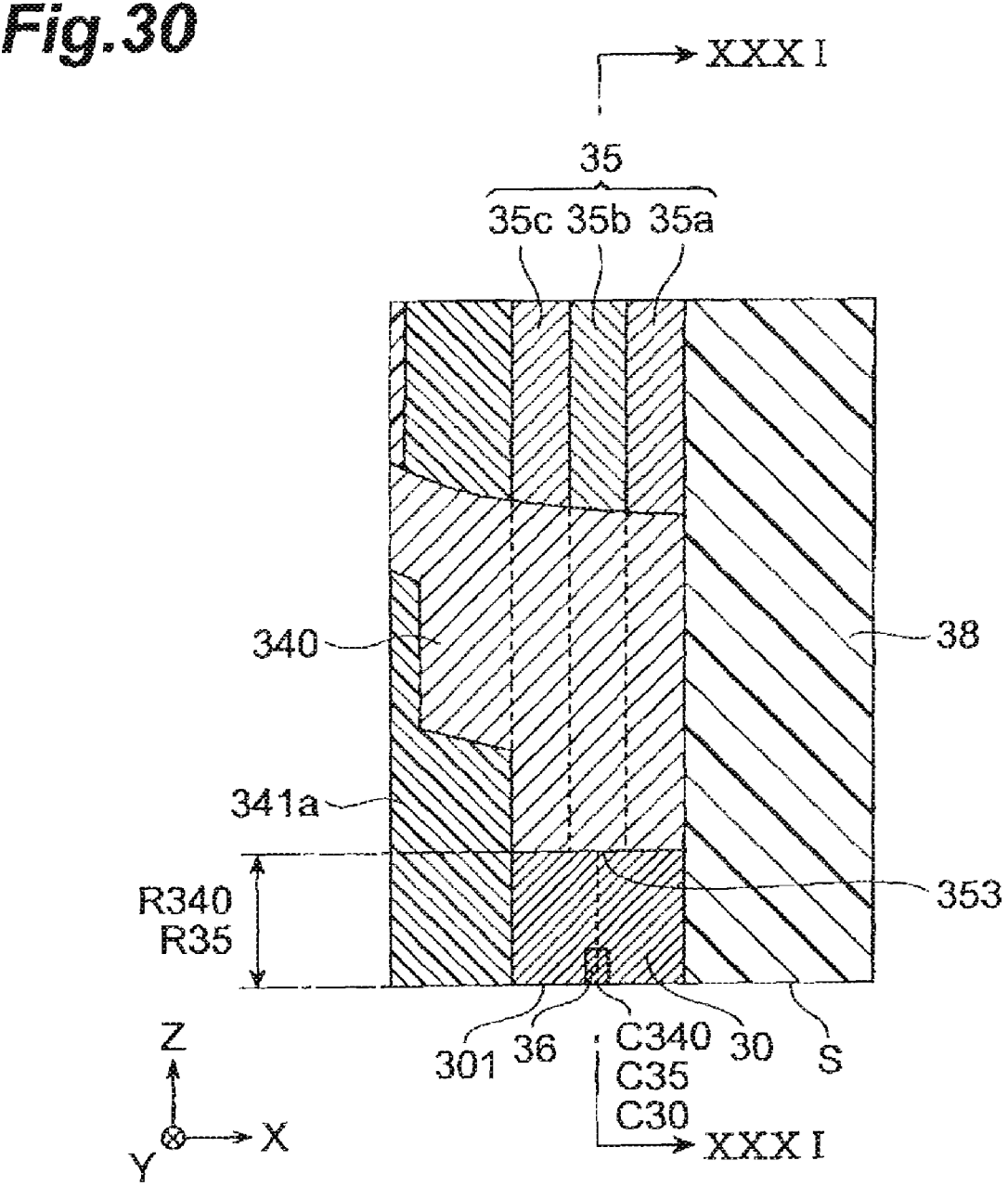
FIG. 30 is an enlarged sectional view of the core and its vicinity shown in FIG. 29.

As shown in FIGS. 29 and 30, the leading end 3401 of the main magnetic pole 340 and the light exit surface 353 of the core 35 are located deeper by R340 (R35) than the medium-opposing surface S as in the first embodiment. Also, as in the first embodiment, the core 30 is positioned between the light exit surface 353 of the core 35 and the medium-opposing surface S. Unlike the first embodiment, however, the main magnetic pole 340 is not in contact with the upper face 352a of the core 35, but coincides therewith in terms of their positions seen in the sectional view taken along the line IV-IV of FIG. 3. It also differs from the first embodiment in that the near-field generating part 36 is provided at the center of the light exit surface 301 of the core 30.

Figure 31:
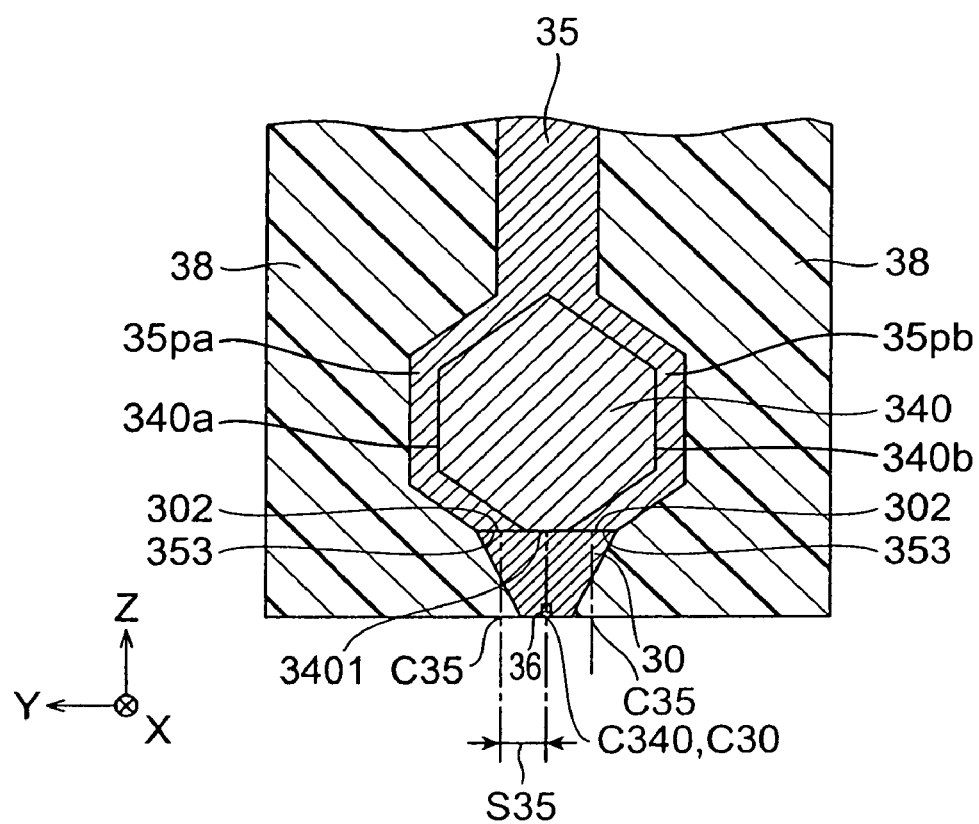
FIG. 31 is a sectional view taken along the line XXXI-XXXI of FIG. 30.

FIG. 31 is a sectional view taken along the line XXXI-XXXI of FIG. 30. As depicted, the core 35 has such a form as to hold the main magnetic pole 340 from both side faces in the track width direction. Namely, the core 35 extends via core parts 35pa and 35pb along side faces 340a and 340b in the XZ plane and a surface obtained when the XZ plane is rotated about the X axis by an angle smaller than ±90 degrees) and intersects a line penetrating through the main magnetic pole 340 in the track width direction.

As in the modified example of the first embodiment, the core 30 is provided not only between the light exit surface 353 of the core 35 and the medium-opposing surface S, but also between the leading end 3401 of the main magnetic pole 340 and the medium-opposing surface S. Also, as in the first embodiment the core 30 gradually narrows the width in the track width direction toward the medium-opposing surface S, thus exhibiting a tapered form, thereby making it possible to focus the light propagating through the core 30 and irradiate the near-field light generating part 36 therewith, so as to generate near-field light with a high intensity. However, the core 30 as a whole is constituted by a material similar to that constituting the inner core 35b of the core 35, for example, instead of a multilayer structure.

Figure 32:
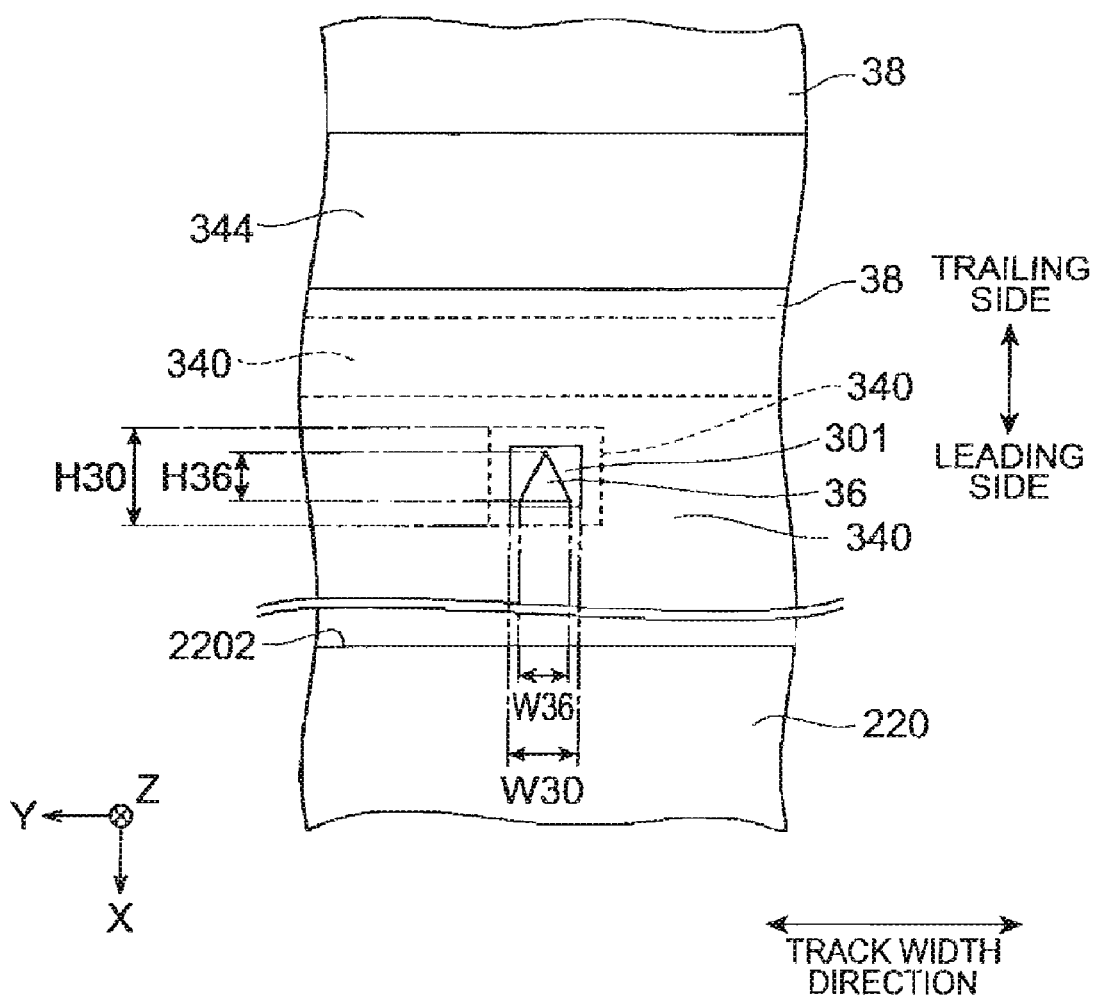
FIG. 32 is a perspective view of the magnetic head part 32 in the second embodiment as seen from the medium-opposing surface side.
Figure 33:
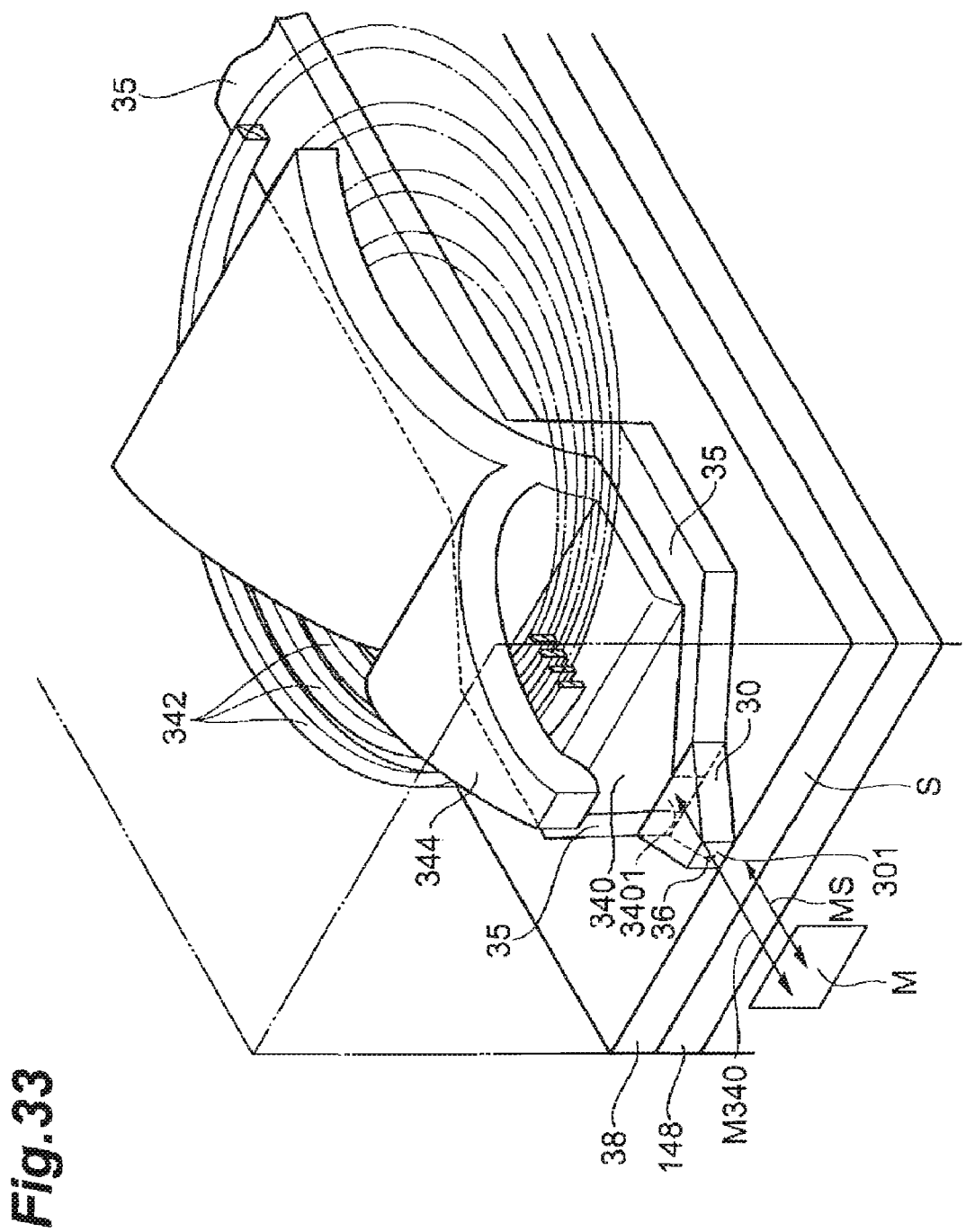
FIG. 33 is a perspective view of the magnetic head part 32 in the second embodiment as seen from the medium-opposing surface side.

FIG. 32 is a plan view of a main part of the magnetic head in accordance with the second embodiment as seen from the medium-opposing surface S side, whereas FIG. 33 is a perspective view of the magnetic head part 32 in accordance with the second embodiment as seen from the medium-opposing surface S side. As shown in these drawings, the position of the leading end 3401 of the main magnetic pole 340 overlaps that of the light exit surface 301 when seen from the medium-opposing surface S side. The position at which the center of the leading end 3401 of the main magnetic pole 340 is orthographically projected onto the reference plane S can substantially coincide with the position of the near-field light generating part 36 within the light exit surface 301.

The distance M340 from the leading end 3401 of the main magnetic pole 340 to the magnetic recording medium M is set longer than the distance MS from the medium-opposing surface S opposing the magnetic recording medium M to the magnetic recording medium M. Namely, the main magnetic pole 340 is positioned in a deeper part of the head, so that the distance R340 (or R35) is set as mentioned above.

Letting C35, C30, and C340 be the respective positions where the center of the optical intensity distribution of the light exit surface 353, the center of the optical intensity distribution of the optical exit surface 301, and the center of the leading end 3401 of the main magnetic pole 340 are orthographically projected onto the reference plane S (referred to with the same letter as that of the medium-opposing surface since the light exit surface 301 is also placed within the medium-opposing surface S in the second embodiment) including the medium-opposing surface S, the distance from C30 to C340 (S30=0) is shorter than the distance S35 from C35 to C340 in the second embodiment. In other words, the distance S35 is greater than the distance S30. Therefore, as in the first embodiment, the time elapsing after beating the magnetic recording medium until a writing magnetic field is applied to the heated recording area can be shortened. As a result, it is not necessary to keep the high-temperature state in the recording area of the magnetic recording medium for a long time, whereby the recording frequency at the time of magnetic recording can be made high.

Further, in the second embodiment, the position of the core 35 in the bit length direction (laminating direction of the magnetic head) substantially coincides with the center of the leading end 3401 of the main magnetic pole 340. This makes it unnecessary for the light incident on the light entrance surface 302 of the core 30 from the light exit surface 353 of the core 35 to bend its advancing direction to the bit-length direction with the core 30. As a result, the center of the intensity distribution of the light emitted from the light exit surface 301 of the core 30 can reliably be located closer to the position of the main magnetic pole 340 as seen from the medium-opposing surface S.

The core 35 extends along both side faces of the main magnetic pole 340 in the track width direction in FIG. 31, but may extend along one side face alone.

The present invention is not limited to the above-mentioned embodiments.

For example, the form of the near-field light generating part is not limited to those mentioned above. For instance, one having a trapezoidal form produced by flattening the vertex 36c of the triangular form may also be employed. A so-called "bow-tie" structure in which a pair of triangular or trapezoidal plates are opposed to each other with their vertexes or shorter sides being spaced by a predetermined distance may also be employed.

Figure 34:
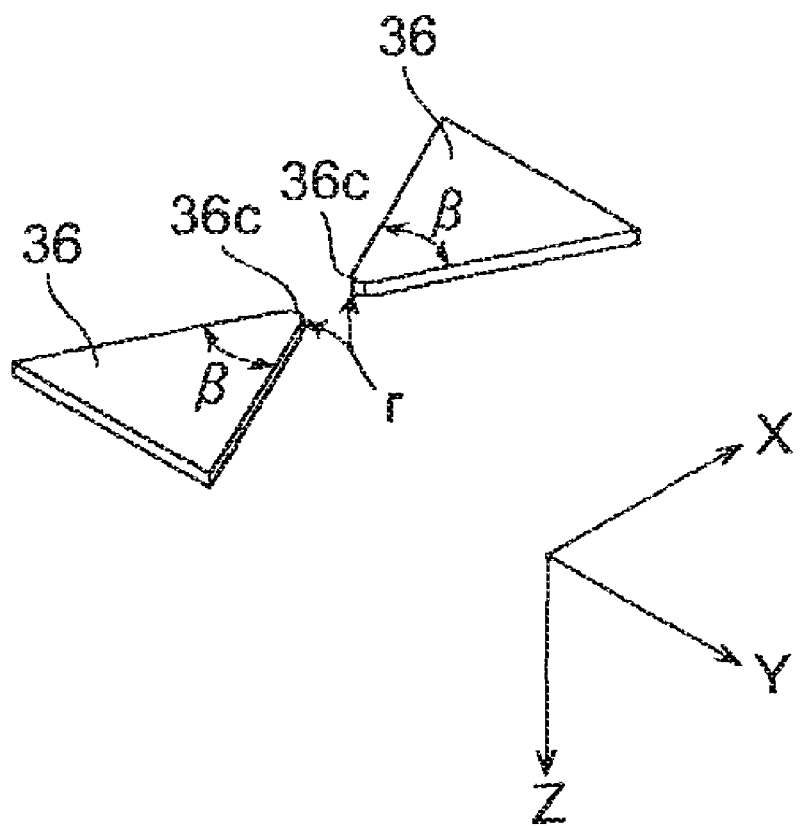
FIG. 34 is a perspective view of the near-field light generating part 36 having a "bow-tie" structure.

FIG. 34 is a perspective view of the near-field light generating part 36 having a "bow-tie" structure. A pair of near-field light generating parts 36 are arranged such as to oppose each other along the X axis, so that their vertexes 36c face each other with a predetermined gap therebetween. This "bow-tie" structure causes a very strong electric field concentration at the center part between the vertexes 36c, thereby yielding near-field light.

The coil layer 342 is a single layer in FIG. 4 and the like, but may be constituted by two or more layers or a helical coil.

The heat insulating layer 230a may be formed at the back face 2201 of the slider substrate 220 or not formed at all.

For bonding the light source unit 23 and slider 22 to each other, means other the UV-curable adhesive may also be used. For example, a solder layer of AuSn or the like used for bonding the laser diode 40 and electrode pad 47 to each other may be employed.

A hard disk drive equipped with the above-mentioned thermally assisted magnetic head and HGA can realize thermally assisted magnetic recording which responds to high recording frequencies.

All the embodiments described above illustrate but do not limit the present invention, so that the present invention can be carried out in various other modified and altered modes. Therefore, the scope of the present invention is defined only by the scope of claims and their equivalents.

What is claimed is:

1. A thermally assisted magnetic head comprising:
   a medium-opposing surface opposing a magnetic recording medium;
   a magnetic recording device whose distance from a leading end of a main magnetic pole to the magnetic recording medium is set longer than a distance from the medium-opposing surface to the magnetic recording medium, the leading end of the main magnetic pole layer being an end of the main magnetic pole closest to the magnetic recording medium;
   a first core of an optical waveguide for receiving thermally assisting light; and
   a second core of the optical waveguide, positioned between a first light exit surface of the first core and the medium-opposing surface and positioned between the leading end of the main magnetic pole and the magnetic recording medium as seen from a bit length direction, having a second light exit surface on the magnetic recording medium side;
   wherein a distance between a position where an optical intensity distribution center within the first light exit surface is orthographically projected onto a reference plane including the second light exit surface and a position where a center of the leading end of the main magnetic pole is orthographically projected onto the reference plane is greater than a distance between an optical intensity distribution center within the second light exit surface and the position where the center of the leading end of the main magnetic pole is orthographically projected onto the reference plane, and
   wherein the second light exit surface of the second core is a part of the medium-opposing surface.

2. A thermally assisted magnetic head according to claim 1, wherein the position where the center of the leading end of the main magnetic pole is orthographically projected onto the reference plane is within the second light exit surface.

3. A thermally assisted magnetic head according to claim 1, wherein the second light exit surface is provided with a near-field light generating part, the near-field light generating part being made of metal.

4. A thermally assisted magnetic head according to claim 1, wherein the second core increases an effective refractive index along a direction from the first core side to the main magnetic pole side.

5. A thermally assisted magnetic head according to claim 4, wherein the second core is formed by alternately laminating two kinds of materials having refractive indexes different from each other.

6. A thermally assisted magnetic head according to claim 1, wherein the first core extends along a side face of the main magnetic pole intersecting a track width direction and intersects a line penetrating through the main magnetic pole in the track width direction.

7. A thermally assisted magnetic head according to claim 6, wherein
the first core includes a first core part and a second core part,
the first and the second core parts both form the first light exit surface,
the first core part extends along the side face of the main magnetic pole intersecting the track width direction, and
the second core part extends along another side face of main magnetic pole intersecting the track width direction.

8. A head gimbal assembly comprising:
the thermally assisted magnetic head according to claim 1; and
a suspension for supporting the thermally assisted magnetic head.

9. A hard disk drive comprising:
the head gimbal assembly according to claim 8; and
a magnetic recording medium opposing the medium-opposing surface.

10. A thermally assisted magnetic head according to claim 1, wherein a distance from the leading end of the main magnetic pole to the medium-opposing surface is from 0.3 to 1.2 μm.

11. A thermally assisted magnetic head according to claim 1, wherein a distance from a leading end of first core to the medium-opposing surface is from 0.3 to 1.2 μm.

12. A thermally assisted magnetic head according to claim 1, wherein a width in a track width direction of a leading end part of the main magnetic pole is narrower than a width in the track width direction of a base part of the main magnetic pole.

13. A thermally assisted magnetic head according to claim 1, wherein a width in a track width direction of the second light exit surface is from 0.4 to 5 μm.

14. A thermally assisted magnetic head according to claim 13, wherein a length in a bit length direction of the second light exit surface is from 0.8 to 5 μm.

15. A thermally assisted magnetic head according to claim 3, wherein the near-field light generating part is triangular in shape including a base parallel to a track width direction and a vertex facing the base; the vertex has a radius of curvature from 5 to 100 nm; a height of the near-field light generating part is from 20 to 400 nm; and a width of the base is from 20 to 400 nm.

* * * * *